(12) United States Patent
Kuno

(10) Patent No.: US 8,643,904 B2
(45) Date of Patent: Feb. 4, 2014

(54) IMAGE PROCESSING DEVICE SELECTING HALFTONE METHOD FOR EACH SET OF PIXEL DATA OF IMAGE DATA

(75) Inventor: Masashi Kuno, Obu (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 192 days.

(21) Appl. No.: 13/028,153

(22) Filed: Feb. 15, 2011

(65) Prior Publication Data

US 2011/0222124 A1    Sep. 15, 2011

(30) Foreign Application Priority Data

Mar. 15, 2010    (JP) .................... 2010-057711

(51) Int. Cl.
*G06K 15/00*    (2006.01)
(52) U.S. Cl.
USPC .......... 358/3.03; 358/3.06; 358/3.13; 358/1.2
(58) Field of Classification Search
USPC .............. 358/3.03, 1.2, 3.06, 3.13
See application file for complete search history.

(56) References Cited

U.S. PATENT DOCUMENTS

| | | | |
|---|---|---|---|
| 6,438,274 | B1 | 8/2002 | Tokuyama et al. |
| 2002/0196301 | A1 | 12/2002 | Murakami et al. |
| 2007/0182974 | A1 | 8/2007 | Hoshiyama et al. |
| 2008/0106569 | A1 | 5/2008 | Suwa et al. |
| 2008/0218800 | A1* | 9/2008 | Baba ........................ 358/1.18 |
| 2008/0218803 | A1 | 9/2008 | Murakami |
| 2008/0259361 | A1* | 10/2008 | Kakutani ...................... 358/1.8 |
| 2009/0080041 | A1* | 3/2009 | Fan et al. ...................... 358/518 |
| 2011/0222076 | A1 | 9/2011 | Kuno |
| 2011/0222083 | A1 | 9/2011 | Kuno |

FOREIGN PATENT DOCUMENTS

| | | |
|---|---|---|
| JP | H07-302190 A | 11/1995 |
| JP | H11-187255 A | 7/1999 |
| JP | 2001-119582 A | 4/2001 |
| JP | 2004-363795 A | 12/2004 |

(Continued)

OTHER PUBLICATIONS

Japan Patent Office, Office Action for Japanese Patent Application No. 2010-057710 (counterpart to above-captioned patent application), mailed Jan. 24, 2012.

(Continued)

*Primary Examiner* — David K Moore
*Assistant Examiner* — Andrew H Lam
(74) *Attorney, Agent, or Firm* — Baker Botts L.L.P.

(57) ABSTRACT

An image processing device converts original image data to converted image data by performing a scaling process and a color conversion process on the original image data; determines, for each pixel in the converted image data, whether or not at least one set of original pixel data corresponding to the converted pixel includes predetermined data; and produces output image data based on the converted image data. The image processing device selects, for each pixel in the converted image data, a first halftone method when no set of original pixel data corresponding to the converted pixel includes the predetermined data, and a second halftone method when the at least one set of original pixel data corresponding to the converted pixel includes the predetermined data. The image processing device produces output pixel data for each converted pixel in the selected halftone method.

6 Claims, 15 Drawing Sheets

(56) References Cited

FOREIGN PATENT DOCUMENTS

| | | |
|---|---|---|
| JP | 2005-205685 A | 8/2005 |
| JP | 2005-210339 A | 8/2005 |
| JP | 2007-188219 A | 7/2007 |
| JP | 2008-227759 A | 9/2008 |
| JP | 2009-004952 A | 1/2009 |
| JP | 2009-031878 A | 2/2009 |
| JP | 2009-049688 A | 3/2009 |

OTHER PUBLICATIONS

Japan Patent Office, Notice of Allowance for Japanese Patent Application No. 2010-057711 (counterpart to above-captioned patent application), mailed Jan. 24, 2012.

Japan Patent Office, Office Action for Japanese Patent Application No. 2010-057712 (counterpart to above-captioned patent application), mailed Feb. 14, 2012.

* cited by examiner

600 × 600dpi

600 × 300dpi

LARGE DOT    MEDIUM DOT    SMALL DOT    NO DOT

FIG.11(a)
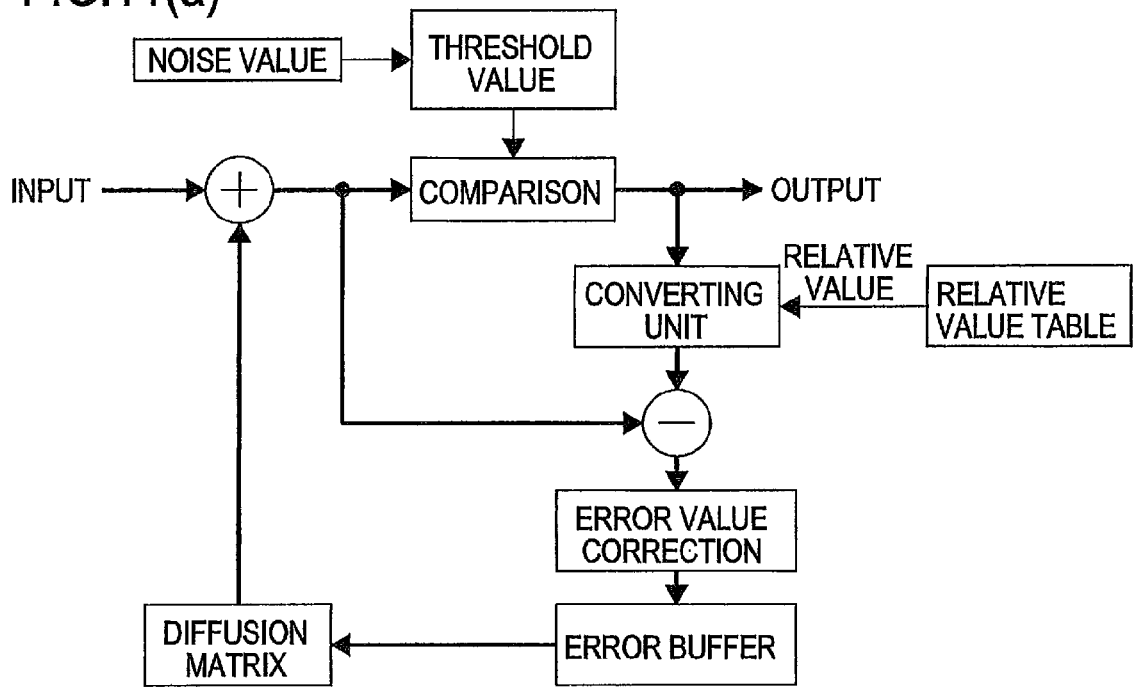
FIG.11(b)
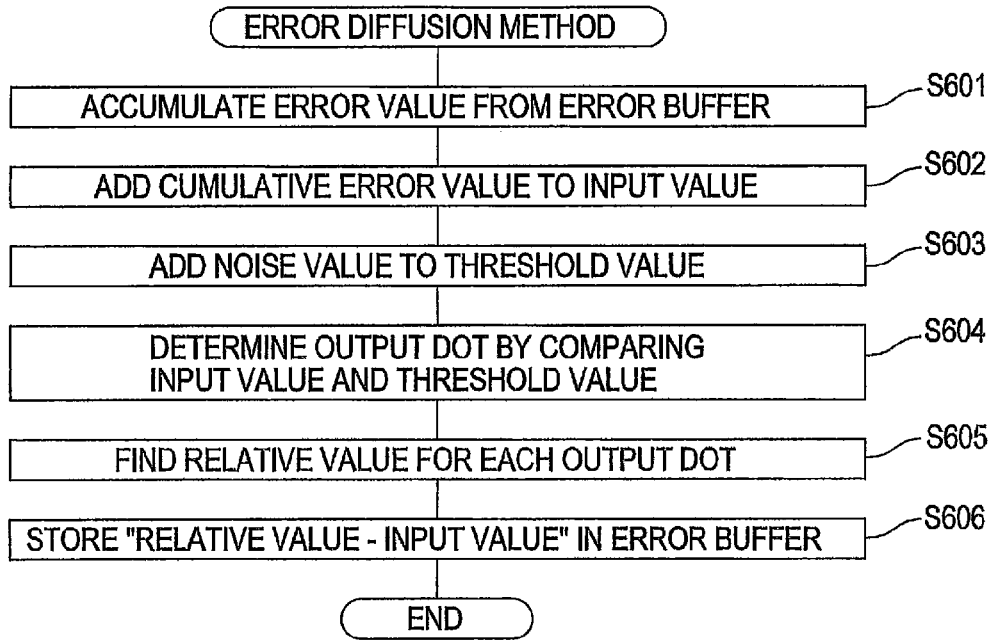
FIG.11(c)

FIG.12(a)
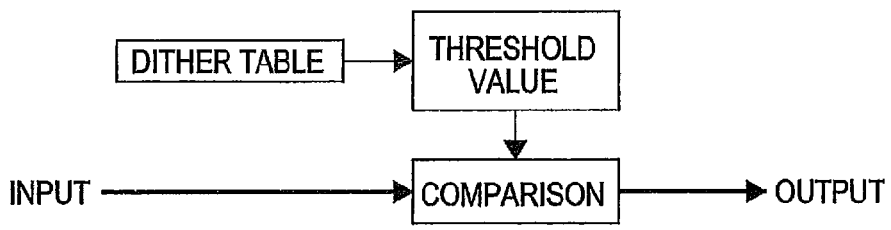
FIG.12(b)
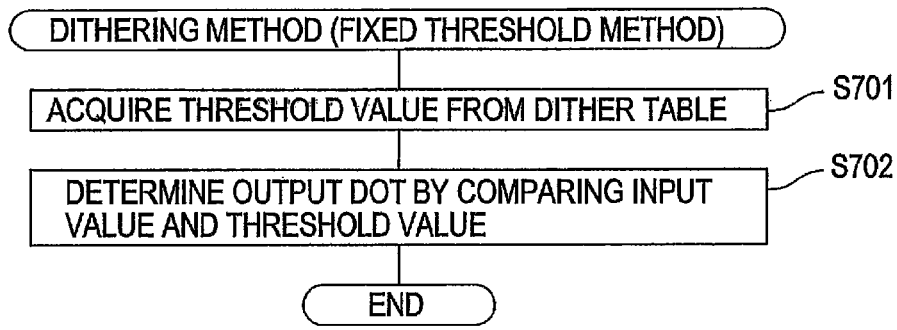
FIG.12(c)
| DITHER TABLE FOR SMALL DOT | | | | | | | | DITHER TABLE FOR MEDIUM DOT | | | | | | | | DITHER TABLE FOR LARGE DOT | | | | | | | |
|---|---|---|---|---|---|---|---|---|---|---|---|---|---|---|---|---|---|---|---|---|---|---|---|
| 0 | 42 | 10 | 53 | 2 | 45 | 13 | 55 | 84 | 126 | 94 | 137 | 86 | 129 | 97 | 139 | 170 | 213 | 180 | 223 | 172 | 215 | 183 | 226 |
| 63 | 21 | 74 | 31 | 66 | 23 | 77 | 34 | 147 | 105 | 158 | 115 | 150 | 107 | 161 | 118 | 234 | 191 | 245 | 202 | 237 | 194 | 248 | 205 |
| 15 | 58 | 5 | 47 | 18 | 61 | 7 | 50 | 99 | 142 | 89 | 131 | 102 | 145 | 91 | 134 | 186 | 229 | 175 | 218 | 188 | 232 | 178 | 221 |
| 79 | 37 | 69 | 26 | 82 | 39 | 71 | 29 | 163 | 121 | 153 | 110 | 166 | 123 | 155 | 113 | 250 | 207 | 240 | 196 | 253 | 210 | 242 | 199 |
| 3 | 46 | 14 | 57 | 1 | 43 | 11 | 54 | 87 | 130 | 98 | 141 | 85 | 127 | 95 | 138 | 174 | 217 | 184 | 228 | 171 | 214 | 182 | 225 |
| 67 | 25 | 78 | 35 | 65 | 22 | 75 | 33 | 151 | 109 | 162 | 119 | 149 | 106 | 159 | 117 | 238 | 195 | 249 | 206 | 236 | 192 | 246 | 203 |
| 19 | 62 | 9 | 51 | 17 | 59 | 6 | 49 | 103 | 146 | 93 | 135 | 101 | 143 | 90 | 133 | 190 | 133 | 179 | 222 | 187 | 230 | 176 | 219 |
| 83 | 41 | 73 | 30 | 81 | 38 | 70 | 27 | 167 | 125 | 157 | 114 | 165 | 122 | 154 | 111 | 254 | 211 | 244 | 201 | 252 | 209 | 241 | 198 |

FIG.15
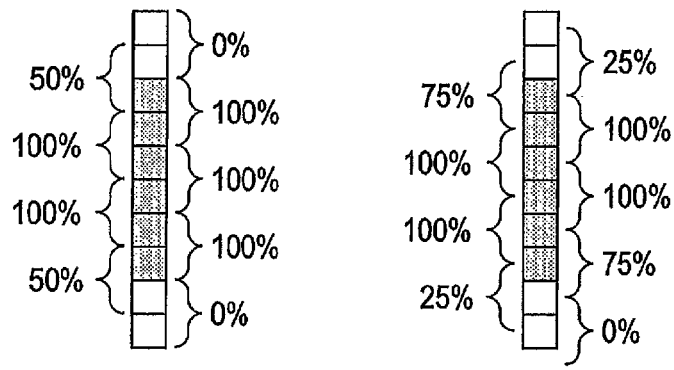
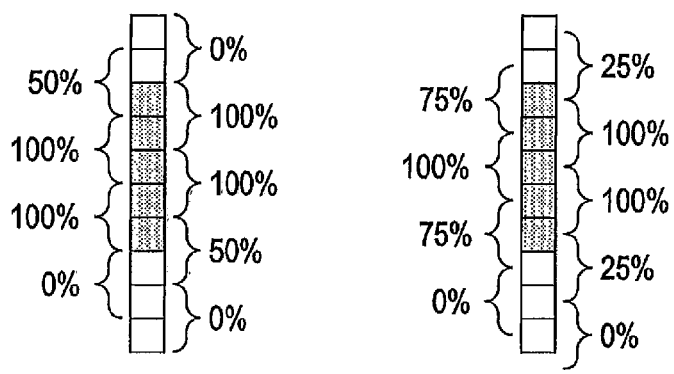
FIG.16
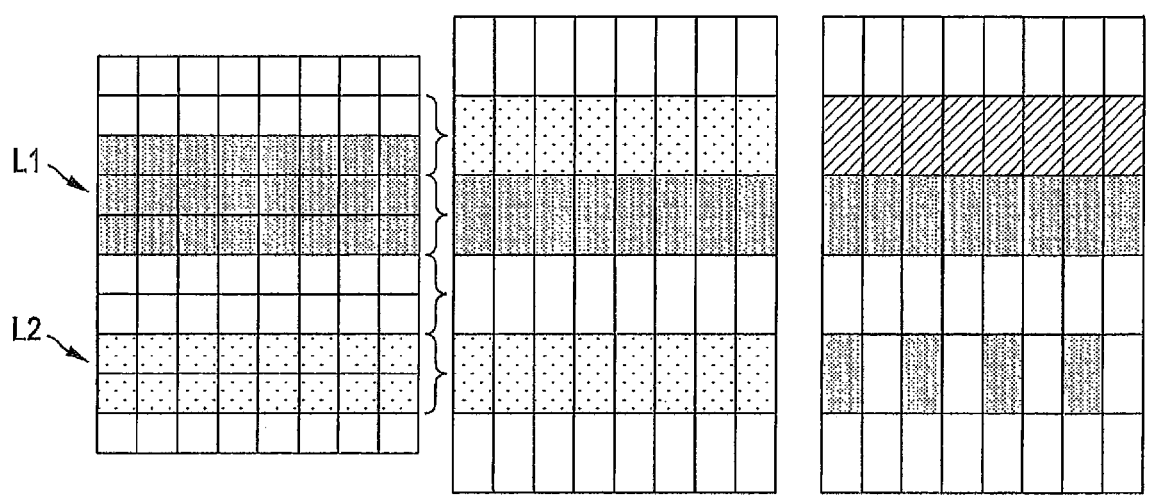

IMAGE PROCESSING DEVICE SELECTING HALFTONE METHOD FOR EACH SET OF PIXEL DATA OF IMAGE DATA

CROSS REFERENCE TO RELATED APPLICATION

This application claims priority from Japanese Patent Application No. 2010-057711 filed Mar. 15, 2010. The entire content of the priority application is incorporated herein by reference.

TECHNICAL FIELD

The present invention relates to an image processing device.

BACKGROUND

An image processor well known in the art for generating image data representing an image to be formed on a printer or other image-forming device first generates image data having a higher resolution than the resolution at which the image-forming device can actually form images, and subsequently performs anti-aliasing to convert the image data to a resolution that the image-forming device supports. For example, when the image-forming device can form images at a resolution of 100 dpi, a conventional image processor first generates image data at 200 dpi and subsequently converts the image data to 100 dpi through a reduction process for converting every four pixels of the 200 dpi image data to one pixel. The value of the pixel resulting from the reduction process is calculated by averaging the values of the four pixels in the original image data. Through this reduction process, pixels in edge portions of characters, graphics, and the like are converted to intermediate values by combining the values of pixels in edge parts with the values of pixels in the background prior to the reduction process, thereby producing edges that appear smooth without a noticeable jagged look.

SUMMARY

Generally it is preferable for a halftone process to increase irregularity among dots in order to prevent a decline in image quality caused by artifacts such as retardation and worms that occur more frequently as dots rendering intermediate tones are formed in more regular patterns. However, the reduction process performed to produce each pixel value from a combination of values of a plurality of pixels (an average value in the above example) in the image prior to the reduction process will worsen the appearance of edges in characters, graphics, and the like in the image resulting from the halftone process.

In other words, when a halftone process is performed without performing the reduction process, pixels constituting characters, graphics, and the like that are to be rendered in black, for example, are directly rendered as dots in the image resulting from the halftone process. In contrast, if the halftone process is performed after the reduction process, edges in characters, graphics, and the like having intermediate pixel values produced during the reduction process will be rendered as highly irregular dots in the halftone process, worsening the appearance of these edge parts.

This problem is not limited to the reduction process, but also may occur in an enlargement process in which the values of pixels resulting from the enlargement process are set to a combination of values for a plurality of pixels prior to the enlargement process.

In view of the foregoing, it is an object of the present invention to provide an image processor and an image processing program capable of reducing the likelihood of an enlargement process or reduction process worsening the appearance of edges in characters, graphics, and the like produced in the halftone process.

In order to attain the above and other objects, the invention provides an image processing device including a converting unit, a determining unit, and a halftone unit. The converting unit is configured to convert original image data to converted image data by performing a scaling process and a color conversion process on the original image data. The original image data includes a plurality of sets of original pixel data. The converted image data has a plurality of sets of converted pixel data. Each set of converted pixel data corresponds to at least one set of original pixel data. The converting unit produces each set of converted pixel data based on the corresponding at least one set of converted pixel data. Each set of converted pixel data includes a plurality of color values. The plurality of color values correspond to a plurality of color materials. Each color value indicates an amount of one of the plurality of color materials. The determining unit is configured to determine, for each set of converted pixel, whether or not at least one set of original pixel data corresponding to the each set of converted pixel data includes predetermined pixel data. The halftone unit is configured to produce output image data based on the converted image data. The halftone unit includes a selecting unit and a pixel data halftone unit. The selecting unit is configured to select, for each set of converted pixel data, a first halftone method when the determining unit determines that all set of at least one set of original pixel data corresponding to the each set of converted pixel data does not include the predetermined pixel data, and a second halftone method different from the first halftone method when the determining unit determines that the at least one set of original pixel data corresponding to the each set of converted pixel data includes the predetermined pixel data. The pixel data halftone unit is configured to produce a set of output pixel data for each set of converted pixel data in accordance with one of the first halftone method and the second halftone method selected by the selecting unit.

According to another aspect, the present invention provides an image processing method including: converting original image data to converted image data by performing a scaling process and a color conversion process on the original image data, the original image data including a plurality of sets of original pixel data, the converted image data having a plurality of sets of converted pixel data, each set of converted pixel data corresponding to at least one set of original pixel data, the converting unit producing each set of converted pixel data based on the corresponding at least one set of converted pixel data, each set of converted pixel data including a plurality of color values, the plurality of color values corresponding to a plurality of color materials, each color value indicating an amount of one of the plurality of color materials; determining, for each set of converted pixel, whether or not at least one set of original pixel data corresponding to the each set of converted pixel data includes predetermined pixel data; and producing output image data based on the converted image data, the producing including: selecting, for each set of converted pixel data, a first halftone method when all set of at least one set of original pixel data corresponding to the each set of converted pixel data does not include the predetermined pixel data, and a second halftone method different from the first halftone method when the at least one set of original pixel data corresponding to the each set of converted pixel data includes the predetermined pixel data; and producing a set of output pixel data for each set of converted pixel data in accordance with one of the first halftone method and the second halftone method selected in the selecting step.

According to another aspect, the present invention provides a non-transitory computer readable storage medium storing a set of program instructions installed on and executed by an image processing device, the program instructions including: converting original image data to converted image data by performing a scaling process and a color conversion process on the original image data, the original image data including a plurality of sets of original pixel data, the converted image data having a plurality of sets of converted pixel data, each set of converted pixel data corresponding to at least one set of original pixel data, the converting unit producing each set of converted pixel data based on the corresponding at least one set of converted pixel data, each set of converted pixel data including a plurality of color values, the plurality of color values corresponding to a plurality of color materials, each color value indicating an amount of one of the plurality of color materials; determining, for each set of converted pixel, whether or not at least one set of original pixel data corresponding to the each set of converted pixel data includes predetermined pixel data; and producing output image data based on the converted image data, the producing including: selecting, for each set of converted pixel data, a first halftone method when all set of at least one set of original pixel data corresponding to the each set of converted pixel data does not include the predetermined pixel data, and a second halftone method different from the first halftone method when the at least one set of original pixel data corresponding to the each set of converted pixel data includes the predetermined pixel data; and producing a set of output pixel data for each set of converted pixel data in accordance with one of the first halftone method and the second halftone method selected in the selecting step.

BRIEF DESCRIPTION OF THE DRAWINGS

The particular features and advantages of the invention as well as other objects will become apparent from the following description taken in connection with the accompanying drawings, in which:

FIG. 11(a) is an explanatory diagram showing an algorism for an error diffusion method;

FIG. 11(b) is a flowchart illustrating steps in the error diffusion method;

FIG. 11(c) shows an example of an error matrix;

FIG. 12(a) is an explanatory diagram showing an algorism for a dithering method and a fixed threshold method;

FIG. 12(b) is a flowchart illustrating steps in the dithering method and the fixed threshold method;

FIG. 12(c) shows an examples of dither table for each size dot;

FIG. 15 is an explanatory diagram showing changes in the appearance from the original image to the reduced image;

FIG. 16 is an explanatory diagram showing changes in the appearance among the original image, the reduced image, and the halftone image;

DETAILED DESCRIPTION

Next, a preferred embodiment of the present invention will be described while referring to the accompanying drawings.

1. Overall Structure of Communication System

Figure 1:
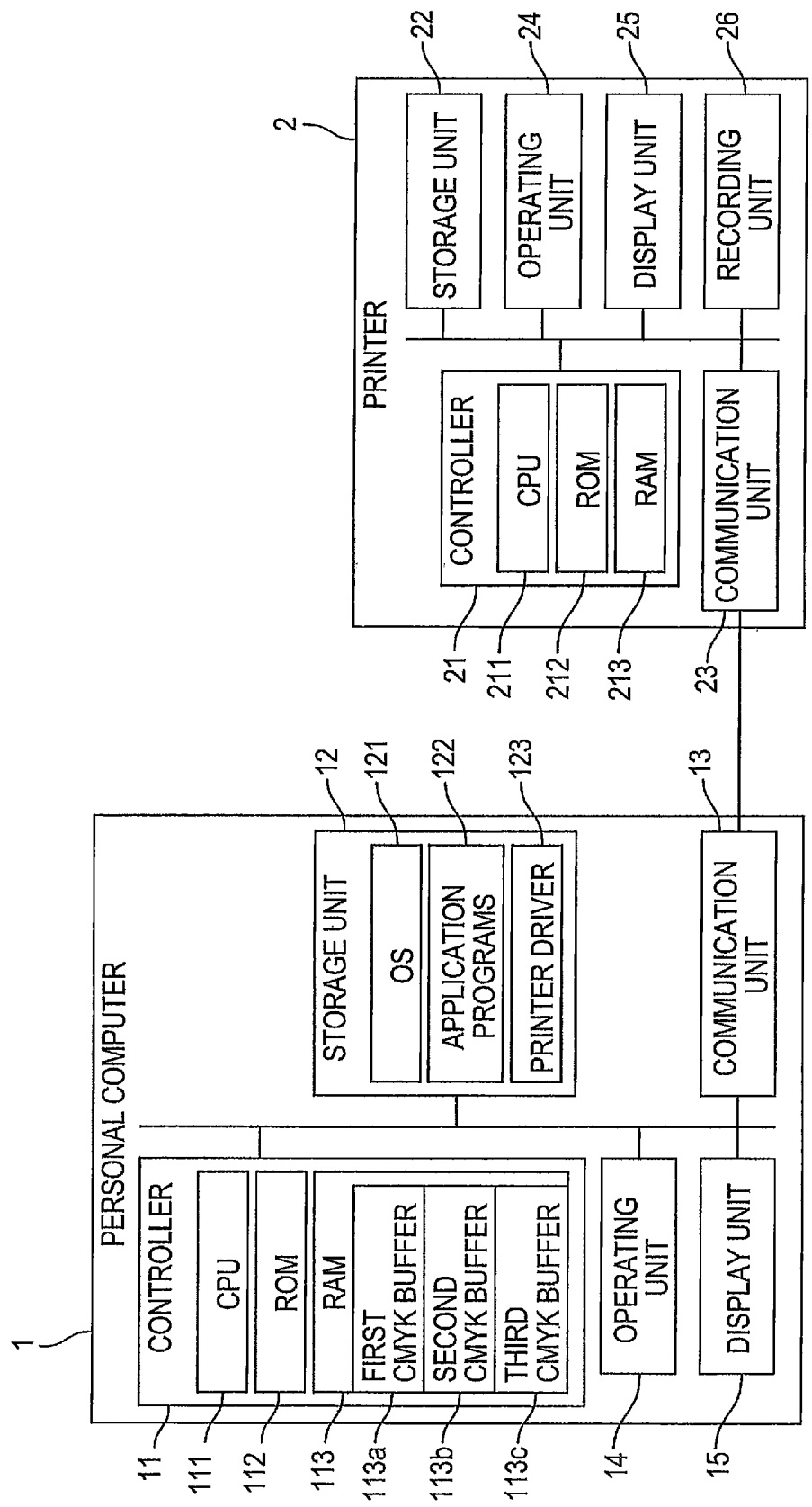
FIG. 1 is an image processing device according to an embodiment of the invention, the image processing device communicating with an image forming unit of an image forming device.

FIG. 1 is a block diagram showing the general structure of a communication system including a personal computer (PC) 1, and a printer 2 that are capable of performing data communications with each other.

The PC 1 is a common data processor that includes a controller 11, a storage unit 12, a communication unit 13, an operating unit 14, and a display unit 15. The controller 11 performs overall control of each component in the PC 1. The controller 11 includes a CPU 111, a ROM 112, and a RAM 113.

The storage unit 12 is a nonvolatile storage device for storing data that can be overwritten. In the preferred embodiment, a hard disk drive is employed as the storage unit 12. Various software programs are installed on the storage unit 12, including an operating system (OS) 121; application programs 122 for implementing a word processor, spreadsheet program, presentation program, and other applications (so-called office software); and a printer driver 123 for enabling the personal computer 1 to use the printer 2.

The communication unit 13 is an interface for performing data communications with the printer 2. The operating unit 14 is an input device that allows the user to input instructions through external operations. In the preferred embodiment, the operating unit 14 is configured of a keyboard and a pointing device (a mouse, touchpad, or the like). The display unit 15 is an output device for displaying various data in a visual form that the user can understand. In the preferred embodiment, the display unit 15 is configured of a liquid crystal display.

Figure 2:
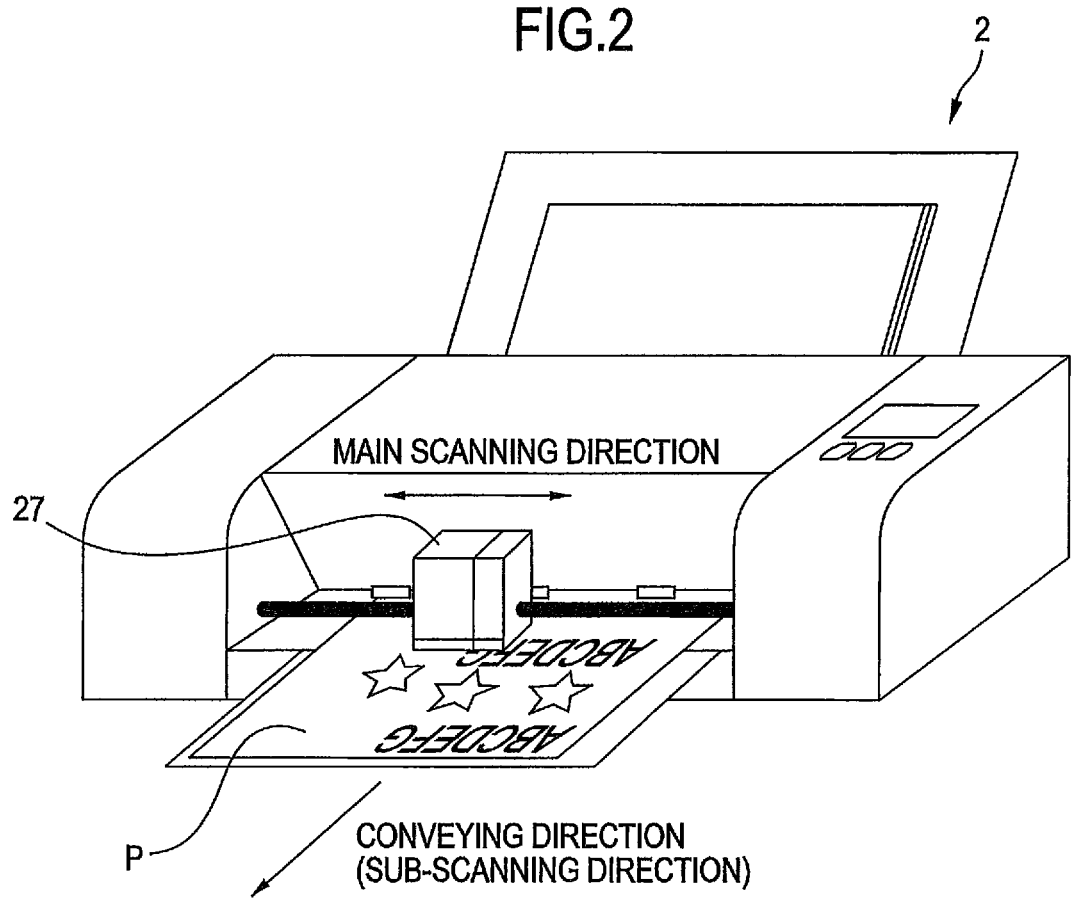
FIG. 2 is a perspective view showing the image forming device.

The printer 2 is an inkjet image forming device as shown in FIG. 2. The printer 2 includes a controller 21, a storage unit 22, a communication unit 23, an operating unit 24, a display unit 25, and a recording unit 26.

The controller 21 performs overall control of each component in the printer 2. The controller 21 includes a CPU 211, a ROM 212, and a RAM 213. The storage unit 22 is a rewritable, nonvolatile storage device. In the preferred embodiment, the storage unit 22 is configured of flash memory. The communication unit 23 is an interface for performing data communications with the PC 1. The operating unit 24 is an input device that allows the user to input instructions through external operations. The operating unit 24 includes various operating buttons.

The display unit 25 is an output device for displaying various data in a visual form that the user can understand. A compact liquid crystal display is used as the display unit 25 in the preferred embodiment.

The recording unit 26 is provided with ink for the colors cyan (C), magenta (M), yellow (Y), and black (K). As shown in FIG. 2, the recording unit 26 has a recording head 27 that reciprocates along a direction (main scanning direction) orthogonal to the conveying direction of paper P (sub scanning direction). The recording unit 26 forms images on a sheet of paper P by ejecting ink droplets from the reciprocating recording head 27. More specifically, a plurality of nozzles (not shown) are formed in the bottom surface (surface opposing the paper P) of the recording head 27. Ink droplets in the colors C, M, Y, and K are ejected onto the paper P through these nozzles. The recording unit 26 forms an image on a sheet of paper P by ejecting ink droplets from the nozzles based on image data while reciprocating the recording head 27 in the main scanning direction. An operation to eject ink droplets while the recording head 27 is moving is performed alternately with an operation to convey the sheet of paper P so that the ejection operations are not performed while the paper P is conveyed.

In order to render color gradations more naturally, the recording unit 26 also performs droplet control based on image data expressing each pixel of the image in one of more than two levels. In this embodiment, the recording unit 26 regulates the quantity of ink ejected for each ink droplet at one of a plurality of levels in order to express four levels of dot formation; specifically, a large dot, a medium dot, a small dot, and no dot. The ratios of density among the large dot, medium dot, and small dot may be set to 100:50:25, for example.

2. Overview of Processes Performed by the Communication System

Next, an overview of the processes executed by the communication system according to the preferred embodiment will be described. The printer driver 123 is started when the user of the personal computer 1 executes a print operation in a running application. The printer driver 123 rasterizes image data targeted for a print job (i.e., converts the image data to bitmap data) generating 256-level bitmap data (or "pixel data") expressed as RGB values. Next, the printer driver 123 performs a color conversion process to convert this bitmap data (RGB data) to image data expressed in the basic colors C, M, Y, and K representing the colors of ink used in the printer 2. The printer driver 123 further performs a halftone process for reducing the number of gradation levels of the image to four levels corresponding to a large dot, medium dot, small dot, or no dot. The printer 2 then forms an image (prints) by ejecting ink droplets onto a sheet of paper P based on the four-level CMYK data generated above.

Figure 3A:
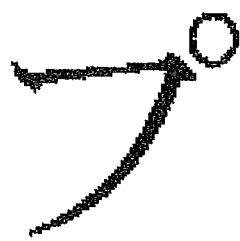
FIGS. 3(a) and 3(b) show a character formed at a high resolution and at a low resolution, respectively.
Figure 3B:
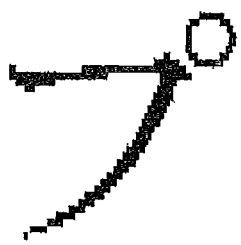

Here, while the edge parts (contours) of characters, graphics, and the like appear smoother for higher printing resolutions in images printed on the printer 2, the printing speed drops because a higher resolution image takes longer to print. The drop in printing speed is particularly noticeable in a printer similar to the printer 2 of the preferred embodiment that reciprocates the recording head 27 in the main scanning direction because the movement (number of passes) of the recording head 27 is increased. However, reducing the printing resolution will produce more noticeable jagged edges in characters, graphics, and the like printed on the paper P. FIG. 3(a) shows an example of printing a character at 600×600 dpi, whereby the first value indicates the resolution in the main scanning direction (x direction) and the second value indicates the resolution in the sub scanning direction (y direction). FIG. 3(b) shows the same character printed at the resolution 600×300 dpi. As illustrated in the drawings, while the printing resolution in the example of FIG. 3(b) is reduced by half in the sub scanning direction in order to print the character in fewer passes, the edges of the character do not appear as smooth as in the example in FIG. 3(a).

Figure 4A:
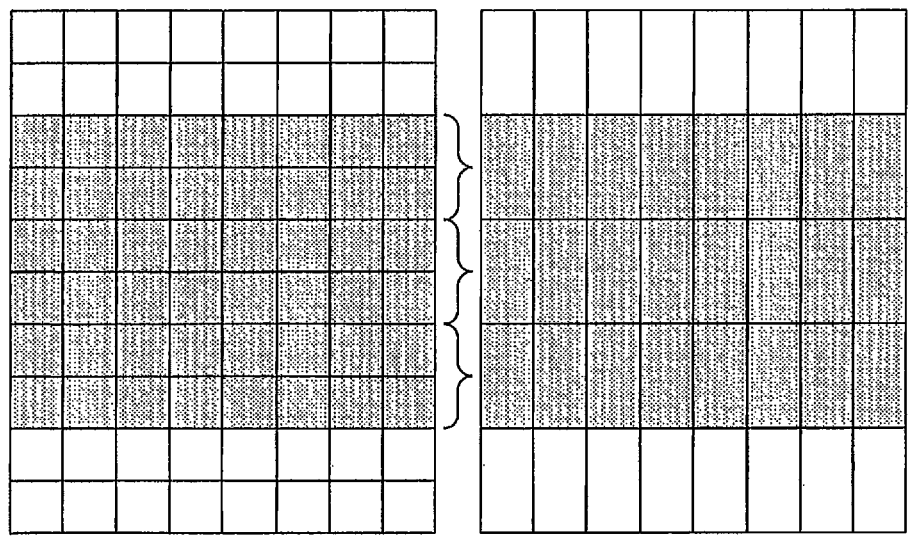
FIGS. 4(a) and 4(b) are explanatory diagrams showing how to convert an original image to a reduced image.
Figure 4B:
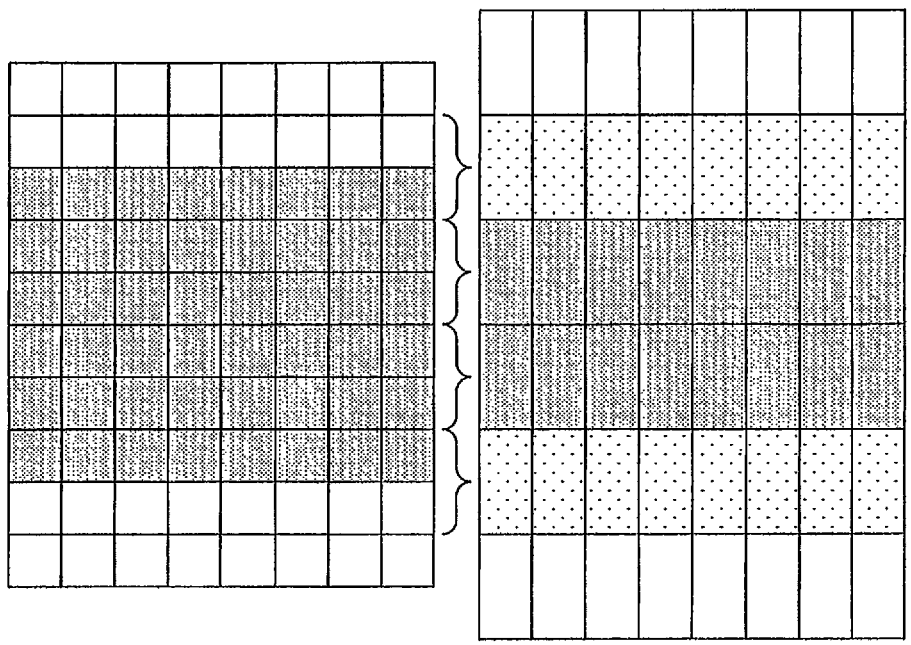

One well known method for resolving this problem is anti-aliasing, whereby the resolution of the target print data is reduced after first rasterizing the image data at a higher resolution than the actual printing resolution. However, when performing this type of anti-aliasing, the thickness of lines (line widths) may appear differently from the original image when the image is rasterized at a high resolution that is an integer multiple of the printing resolution and subsequently reduced by the integer multiple. For example, FIGS. 4(a) and 4(b) show changes in images whose resolutions have both been reduced by one-half in the sub scanning direction. The left image in both FIGS. 4(a) and 4(b) is the original image having a resolution of 600×600 dpi, while the right image is the reduced image with a resolution of 600×300 dpi. In the example of FIG. 4(a), the line width (number of pixels in the y direction) of the reduced image is three pixels. In FIG. 4(b), one pixel in an intermediate color is generated on the top and bottom in addition to the two pixels of the dark color in the center, for a total of four pixels. Thus, the thickness of the line in the reduced image appears quite different.

Figure 5A:
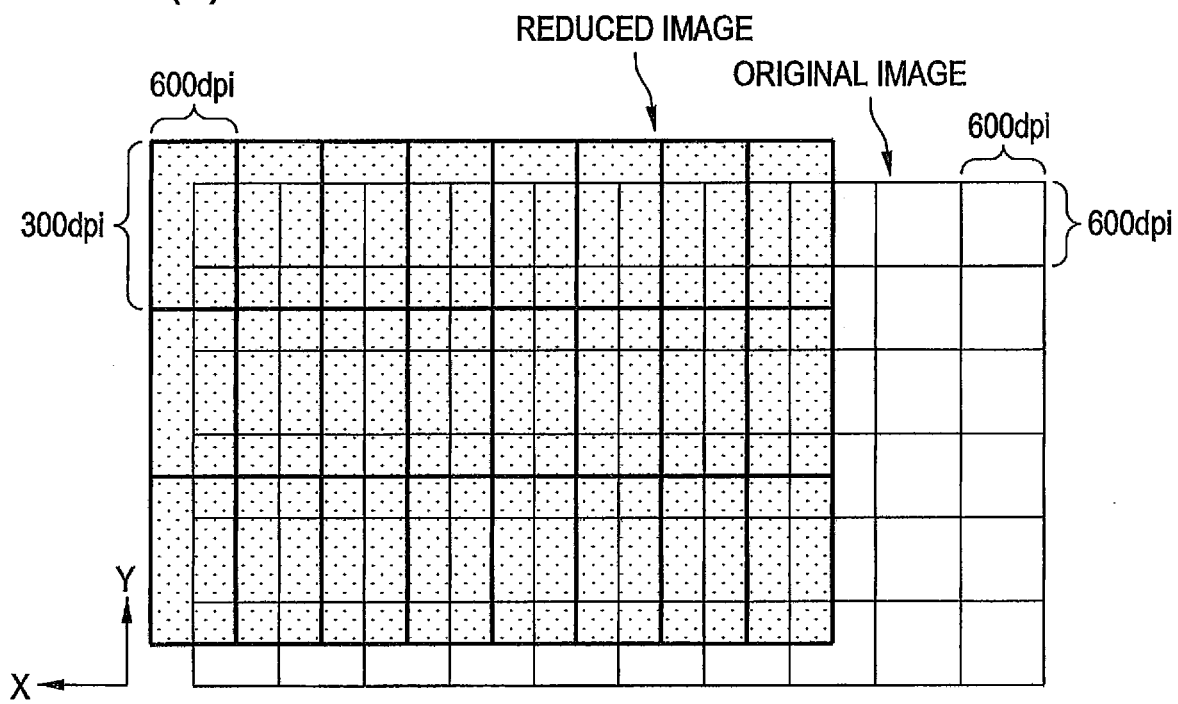
FIGS. 5(a) through 5(c) are explanatory diagrams showing a relationship between the original image and the reduced image corresponding the embodiment.

Therefore, the personal computer 1 according to this embodiment performs the following reduction process. The personal computer 1 treats each pixel constituting an image not as a point, but as a grid having a fixed area, and treats an image as an aggregate of these grids. The personal computer 1 calculates pixel values in the reduced image by combining some or all values of pixels in the original image that fall within the area of the pixel in the reduced image when the reduced image and original image of the same size are superposed, based on the area ratio of the part of the original image included in a pixel of the reduced image. Next, the superposed position of the reduced image (or rather the origin point of the pixel at which the reduction process is begun) is offset relative to the original image. More specifically, as shown in FIG. 5(a), the reduced image is shifted 0.5 pixels leftward in the x direction (corresponding to the main scanning direction) and upward in the y direction (corresponding the to sub canning direction) relative to the original image based on a unit pixel in the original image (600 dpi), and the original image is reduced by two times in the y direction based on this superposed position. Through this method, the values of pixels in edge parts of characters, graphics, and the like prior to the reduction process are combined with values of background pixels in the reduction process based on the area ratio. As a result, edge parts in characters, graphics, and the like appear smoother in the reduced image.

Figure 6A:
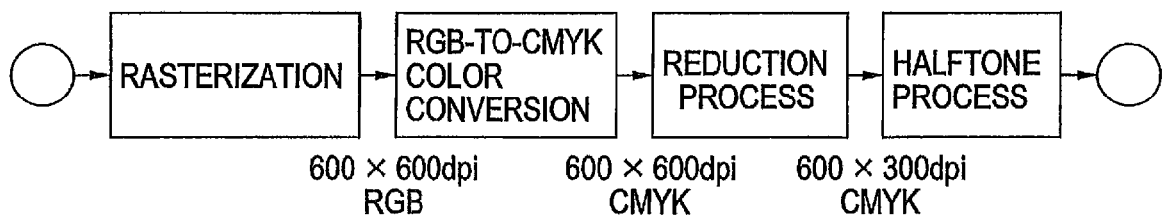
FIG. 6(a) is an explanatory diagram illustrating a processing order in order of rasterization, an RGB-to-CMYK color conversion, a reduction process, and a halftone process.

As yet another problem, the reduction process may cause a worsening in the appearance of edges on characters, graphics, and the like rendered in black following the halftone process. An illustration of this problem will be described based on the method shown in FIG. 6(a) in which the reduction process is performed after color conversion.

Figure 6B:
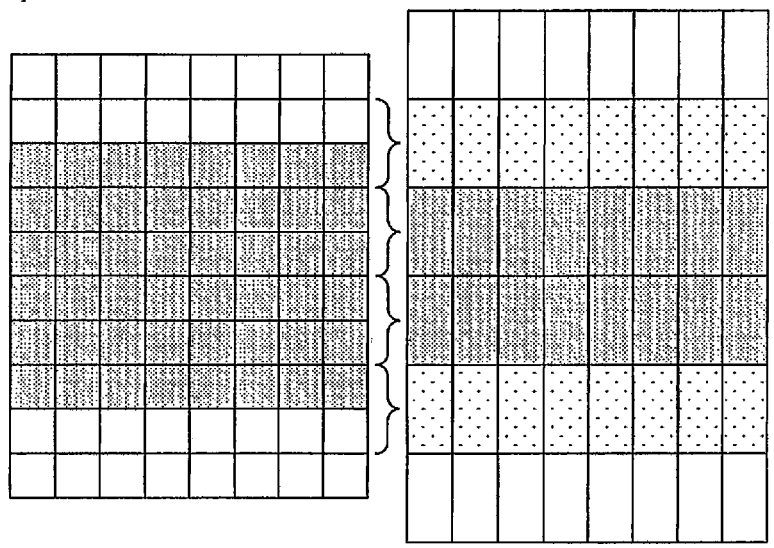
FIG. 6(b) is an explanatory diagram showing how to convert the original image to the reduced image.

FIG. 6(b) illustrates changes in an image when the resolution is reduced by one-half in the sub scanning direction, wherein the left image is the original image having a resolution of 600×600 dpi and the right image is the reduced image with a resolution of 600×300 dpi. Pixels in the dark region of the original image have the values RGB=(0, 0, 0). In the color conversion process, these values are converted to CMYK=(0, 0, 0, 255). Pixels in regions with no color have the values RGB=(255, 255, 255). These pixel values are converted to CMYK=(0, 0, 0, 0) in the color conversion process.

Figure 6C:
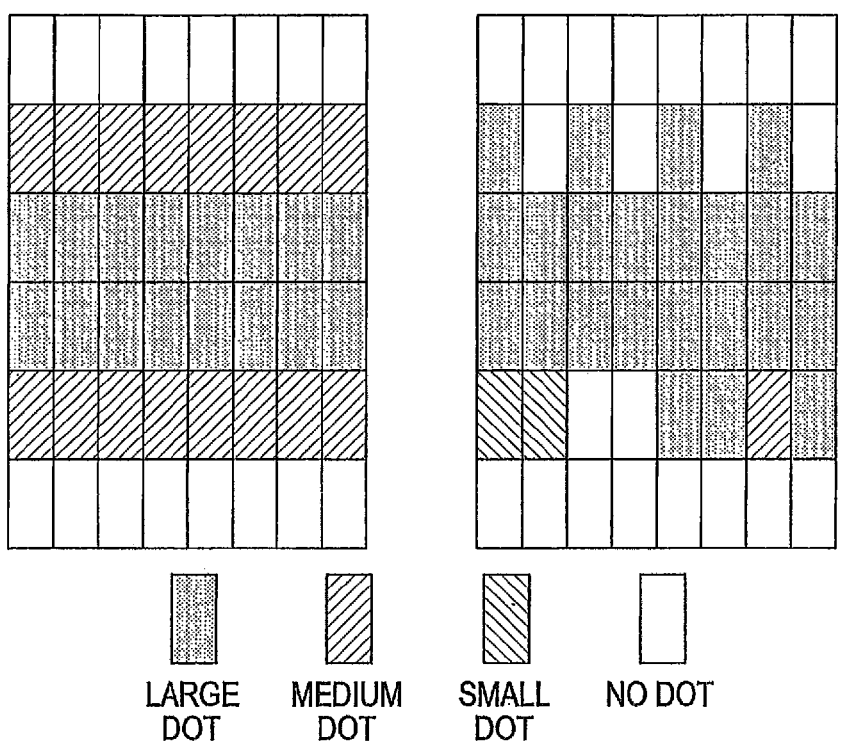
FIG. 6(c) is an explanatory diagram showing examples of halftone images generated by converting the reduced image in different halftone methods.

After color conversion is performed on the left image in FIG. 6(b), the reduction process is performed to reduce the resolution to 600×300 dpi, producing an intermediate color region with the pixel values CMYK=(0, 0, 0, 127) in the edges. If the subsequent halftone process simply compares these pixel values to fixed threshold values, the areas with intermediate colors will be orderly rendered in only medium dots, as shown in the left image of FIG. 6(c). However, most common halftone processes adopt a technique that increases irregularity among dots by adding a noise value to the input value or threshold value, for example, in order to reduce artifacts, such as retardation and worms, that can reduce image quality. In the example of FIG. 6(c), rendering the intermediate color regions with an irregular mix of large dots, medium dots, small dots, and no dots creates a jagged appearance in the edges that detracts from the overall image quality, as illustrated in the right image of FIG. 6(c).

Therefore, the personal computer 1 according to this embodiment performs a first halftone process on pixels of the image subjected to a halftone process that do not include pixels having corresponding pixels in the original image that are rendered in black. Thereafter, the personal computer 1 performs a second halftone process on pixels that do include areas with corresponding pixels in the original image rendered in black in order to reduce the irregularity of dots in the resulting image more than in the first halftone process.

3. Steps in Image Processes for Printing

Next, steps in processes executed on the personal computer 1 for outputting data to print an image will be described.

3-1. Print Image Outputting Process

Figure 7:
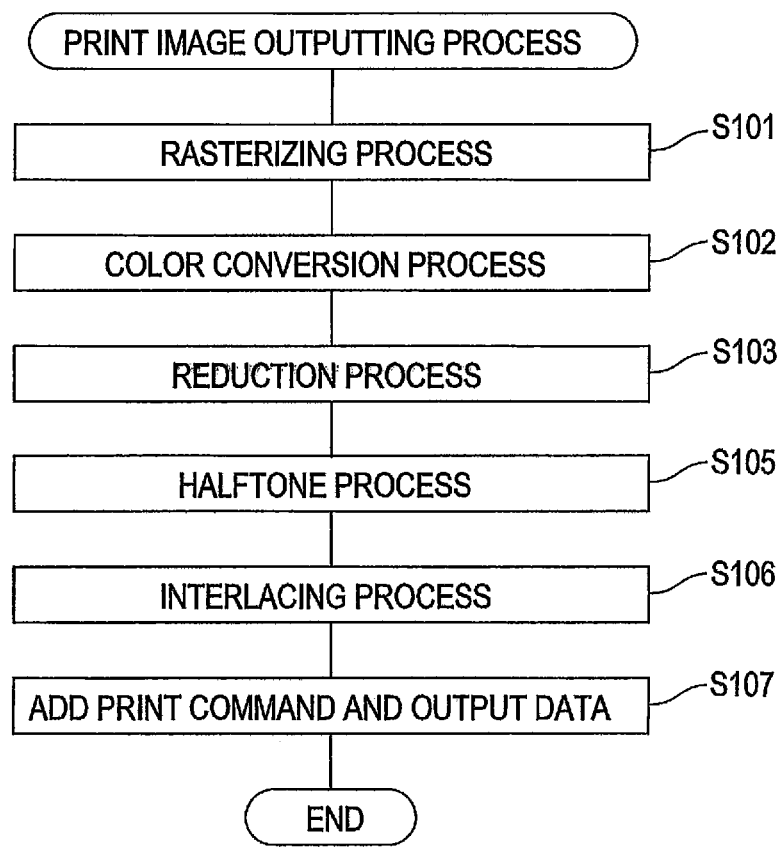
FIG. 7 is a flowchart illustrating steps in a print image outputting process performed by the image processing device.

FIG. 7 is a flowchart illustrating steps in a print image outputting process. The control unit 11 (and more specifically, the CPU 111) of the personal computer 1 executes this print image outputting process as a function of the printer driver 123 when the user of the personal computer 1 performs a printing operation in a running application.

In S101 of FIG. 7 at the beginning of the print image outputting process, the control unit 11 generates 256-level RGB data by rasterizing the image data to be printed at a higher resolution than the actual printing resolution. In the embodiment, image data is rasterized at 600×600 dpi, while the printing resolution is 600×300 dpi.

In S102 the control unit 11 generates CMYK data by performing RGB-to-CMYK color conversion on the RGB data generated in S101. This color conversion process is performed by referencing a three-dimensional look-up table (LUT). In addition to the color conversion process, the control unit 11 may perform other processes in S102, such as a tone curve process for adjusting the recording levels, and an ink quantity restriction process for restricting quantities of ink ejection. The CMYK data has a plurality of sets of converted pixel data. Each set of converted data has CMYK values.

In S103 the control unit 11 performs a reduction process to reduce the CMYK data generated in S102 by two times in the y direction. This process produces CMYK data at 600×300 dpi, the actual printing resolution. As described in details later, the control unit 11 produces reduced image data based on the CMYK image data. The reduced image data includes a plurality of sets of reduced pixel data. Each set of reduced pixel data corresponds to at least one set of CMYK pixel data converted from RGB values. The control unit 11 producing each of reduced pixel data based on the corresponding at least one set of pixel data converted from RGB values.

In S105 the control unit 11 performs a halftone process on the CMYK data generated in S104 to produce four-level CMYK data.

In S106 the control unit 11 performs an interlacing process for producing data based on the CMYK data generated in S105 that assigns print data to each nozzle in the recording head 27 of the printer 2.

In S107 the control unit 11 adds print commands to the data generated in S106 and outputs (transmits) this data to the printer 2, after which the print image outputting process ends. As a result of this process, the image is printed on the printer 2.

3-2. Image Conversion Process

Figure 8:
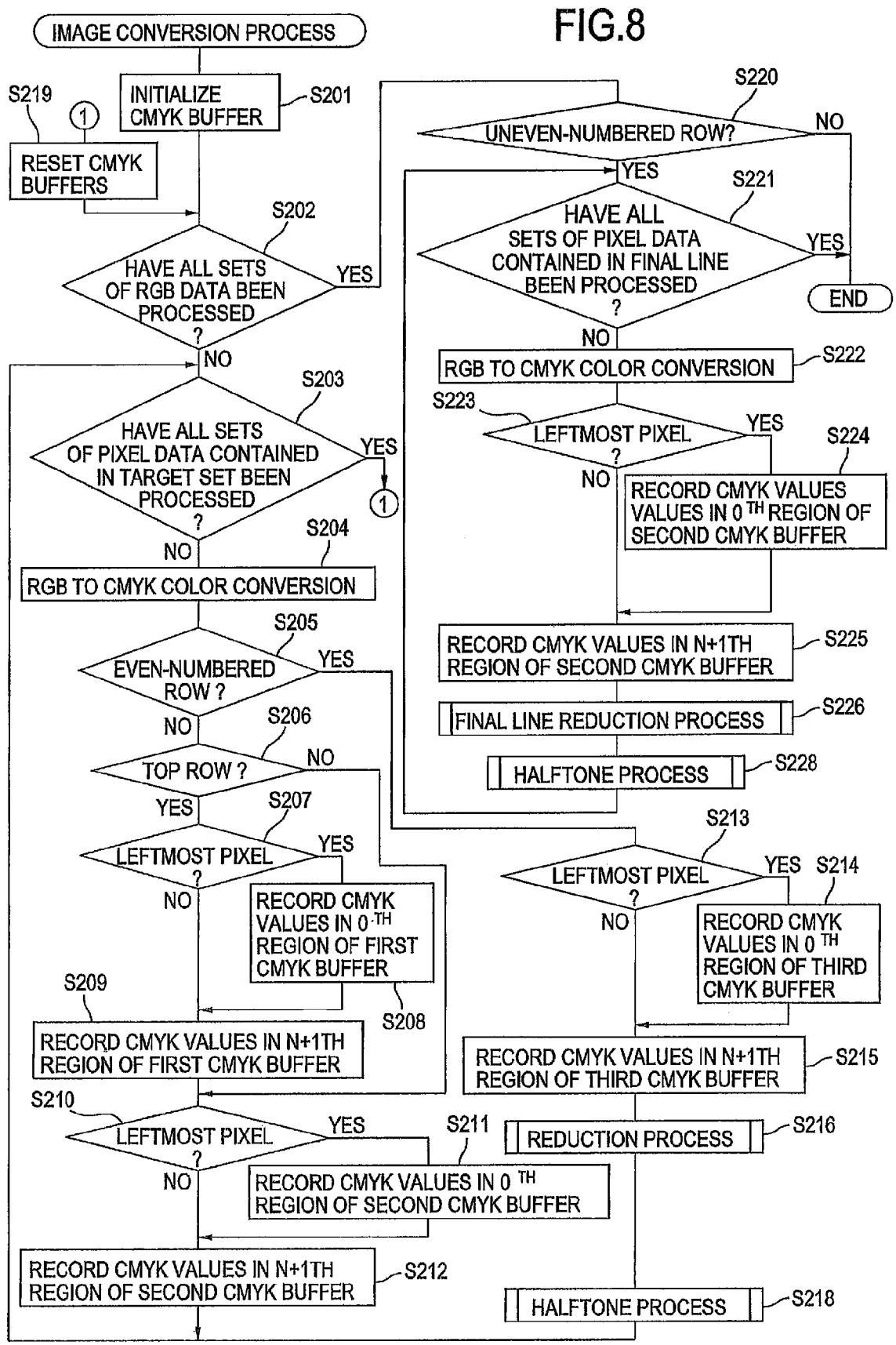
FIG. 8 is a flowchart illustrating steps in an image conversion process performed by the image processing device.

Next, an image conversion process will be described with reference to the flowchart in FIG. 8. The image conversion process corresponds to the color conversion process, reduction process, and halftone process described above in S102-S105. In the following description, the color conversion process is performed on one pixel at a time in the image data, while the reduction process and halftone process are performed each time the color conversion process has been completed for the number of pixels required to calculate the value of a pixel in the reduced image.

In S201 at the beginning of the image conversion process, the control unit 11 initializes CMYK buffers 113a-113c to "0". The CMYK buffers are storage areas allocated in the RAM 113 for storing CMYK values for one line worth of image data. Three CMYK buffers 113a-113c for storing three lines (hereinafter referred to as a first CMYK buffer 113a, a second CMYK buffer 113b, and a third CMYK buffer 113c) have been allocated in the preferred embodiment. Hence, rather than generating data for one page worth all at once, the control unit 11 sequentially generates image data beginning from the topmost line, performs a color conversion process on the generated image data (RGB data) one pixel at a time, as will be described later, and performs the reduction process on the resulting CMYK data. Therefore, since it is necessary to store a part of the CMYK data used in the reduction process, memory area for this part of CMYK is prepared as the CMYK buffers.

In S202 the control unit 11 determines whether or not the process in S203-S219 described later has been completed for all sets of RGB data, where one "set" includes two lines of data with one odd-numbered line and one even-numbered line taken in order from the topmost line of RGB data generated in S101, with the topmost line being treated as an odd-numbered line. If the total number of lines of RGB data is odd, the final line of data will remain unprocessed when the control unit 11 determines in S202 that the above process has been completed for all sets. However, the final line of data is treated in a separate process (S220-S228).

If the control unit 11 determines in S202 that the process has not been completed for all sets (there remain unprocessed sets), then the control unit 11 sets the next process target to the topmost set in the RGB data that has not been processed, and subsequently advances to S203. In S203 the control unit 11 determines whether the process in S204-S218 described later has been completed for all pixels in the target set.

If the control unit 11 determines in S203 that the process has not been completed for all pixels in the target set (there remain unprocessed pixels), then the control unit 11 sets the target pixel to the leftmost pixel among unprocessed pixels in the topmost position of the RGB data, and subsequently advances to S204. In S204 the control unit 11 performs a color conversion process to convert RGB pixel values in the target pixel to CMYK values.

In S205 the control unit 11 determines whether or not the row including the target pixel (hereinafter referred to as the "target row") is an even-numbered row. If the control unit 11 determines in S205 that the target row is not an even-numbered row (i.e., is odd-numbered), in S206 the control unit 11 determines whether the target row is the top row in the RGB data.

If the control unit 11 determines in S206 that the target row is the top row, then in S207 the control unit 11 determines whether the target pixel is the leftmost pixel in the target row. If the control unit 11 determines in S207 that the target pixel is the leftmost pixel, in S208 the control unit 11 records the pixel values (CMYK values) of the target pixel in the $0^{th}$ region of the first CMYK buffer 113a and advances to S209. On the other hand, if the control unit 11 determined in S207 that the target pixel is not the leftmost pixel, the control unit 11 jumps to S209 without executing the process in S208.

In S209 the control unit 11 records the values of the target pixel in the first CMYK buffer. More specifically, when the target pixel is the pixel at position N (where N=0, 1, 2, . . . ) from the left in the process line, the control unit 11 records values of the target pixel in the $(N+1)^{th}$ region of the first CMYK buffer 113a. Subsequently, the control unit 11 advances to S210.

However, if the control unit 11 determines in S206 that the target line is not the top line, then the control unit 11 jumps to S210 without performing the processes in S207 and S208. In S210 the control unit 11 determines whether or not the target pixel is in the leftmost position of the target line. If the control unit 11 determines in S210 that the target pixel is in the leftmost position, in S211 the control unit 11 records the value of the target pixel in the $0^{th}$ region of the second CMYK buffer 113b, and subsequently advances to S212. However, if the control unit 11 determines in S210 that the target pixel is not the leftmost pixel, the control unit 11 skips the process in S211 and advances directly to S212.

In S212 the control unit 11 records the value of the target pixel in the second CMYK buffer. Specifically, as with S209 described above, when processing a pixel in the $N^{th}$ position from the left within the target line, the control unit 11 records the value of the target pixel in the $(N+1)^{th}$ region of the second CMYK buffer 113b. Subsequently, the control unit 11 returns to S203.

On the other hand, if the control unit 11 determines in S205 that the target line is an even-numbered line, the control unit 11 jumps to S213 and determines whether or not the target pixel is in the leftmost position in the target line. If the control unit 11 determines in S213 that the target pixel is the leftmost pixel in the line, in S214 the control unit 11 records the value of the target pixel in the $0^{th}$ area of the third CMYK buffer 113c, and subsequently advances to S215. However, if the control unit 11 determines in S213 that the pixel is not the leftmost pixel in the line, the control unit 11 skips S214 and advances directly to S215.

In S215 the control unit 11 records the value of the target pixel in the third CMYK buffer. Specifically, as in S209 and S212 described above, when processing a pixel in the $N^{th}$ position from the left of the target line, the control unit 11 records the value of the target pixel in the $(N+1)^{th}$ region of the third CMYK buffer.

In S216 the control unit 11 performs a reduction process to calculate the values of pixels in the reduced image based on the target pixel and pixels around the target pixel that have already been processed. The reduction process will be described later in greater detail with reference to FIG. 10.

In S218 the control unit 11 performs a halftone process on the reduced pixel values calculated in the reduction process of S216, and subsequently returns to S203. The halftone process will be described later in greater detail with reference to FIG. 14(b).

Further, when the control unit 11 determines in S203 that all pixels in the target set have been processed, in S219 the control unit 11 performs a process to reset the CMYK buffers 113a-113c and returns to S202. More specifically, the control unit 11 copies the values stored in the third CMYK buffer 113c to the first CMYK buffer 113a and subsequently erases the values stored in both the second and third CMYK buffers 113b and 113c (initializes the values to "0"). In this process, it may not be necessary to actually copy values from one buffer to another; rather the positions of memory pointers indicating the buffers may be modified.

Further, if the control unit 11 determines in S202 that all sets have been processed (there remain no unprocessed sets), in S220 the control unit 11 determines whether or not the line of RGB data is odd-numbered. That is, the control unit 11 determines whether there remains a final line to be processed.

If the control unit 11 determines in S220 that the line of RGB data is odd-numbered (that there exists a final unprocessed line), in S221 the control unit 11 determines whether or not all pixels in the final line have been subjected to the process in S222-S228 described below.

When the control unit 11 determines in S221 that the process has not been completed for all pixels in the final line (that there remain unprocessed pixels), the control unit 11 selects the pixel in the leftmost position of the RGB data for the unprocessed pixels as the target pixel and advances to S222. In S222 the control unit 11 performs the color conversion process to convert the RGB data for the target pixel to CMYK data.

In S223 the control unit 11 determines whether or not the target pixel is the leftmost pixel in the final line. If the control unit 11 determines in S223 that the target pixel is the leftmost pixel, in S224 the control unit 11 stores the value of the target pixel in the $0^{th}$ region of the second CMYK buffer and advances to S225. However, if the control unit 11 determines in S223 that the target pixel is not the leftmost pixel, the control unit 11 skips S224 and advances directly to S225.

In S225 the control unit 11 stores the value of the target pixel in the second CMYK buffer. Specifically, as in S212 described earlier, when processing the pixel in the $N^{th}$ position from the left of the target line, the control unit 11 stores the value of the target pixel in the $(N+1)^{th}$ region of the second CMYK buffer 113b.

In S226 the control unit 11 performs the reduction process for calculating the values of pixels in the reduced image based on the target pixel and pixels around the target pixel that have already been processed (hereinafter referred to as the "final line reduction process"). The final line reduction process will be described later in greater detail with reference to FIG. 11.

Figure 14A:
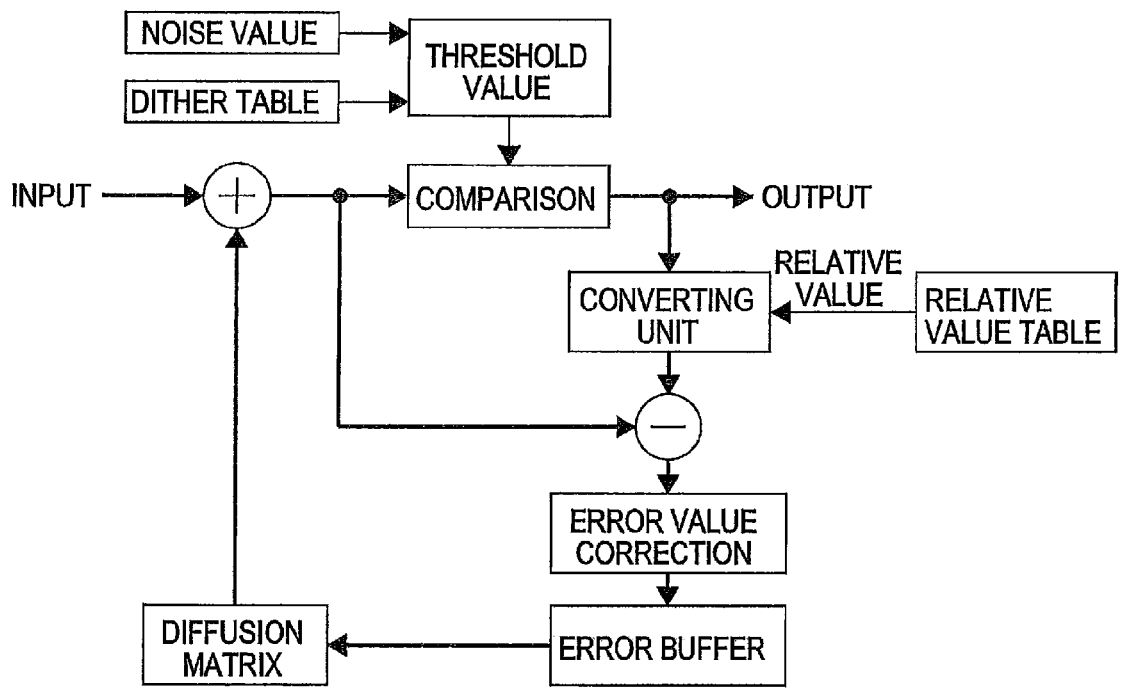
FIG. 14(a) is an explanatory diagram showing an algorism for a halftone process according to the embodiment.
Figure 14B:
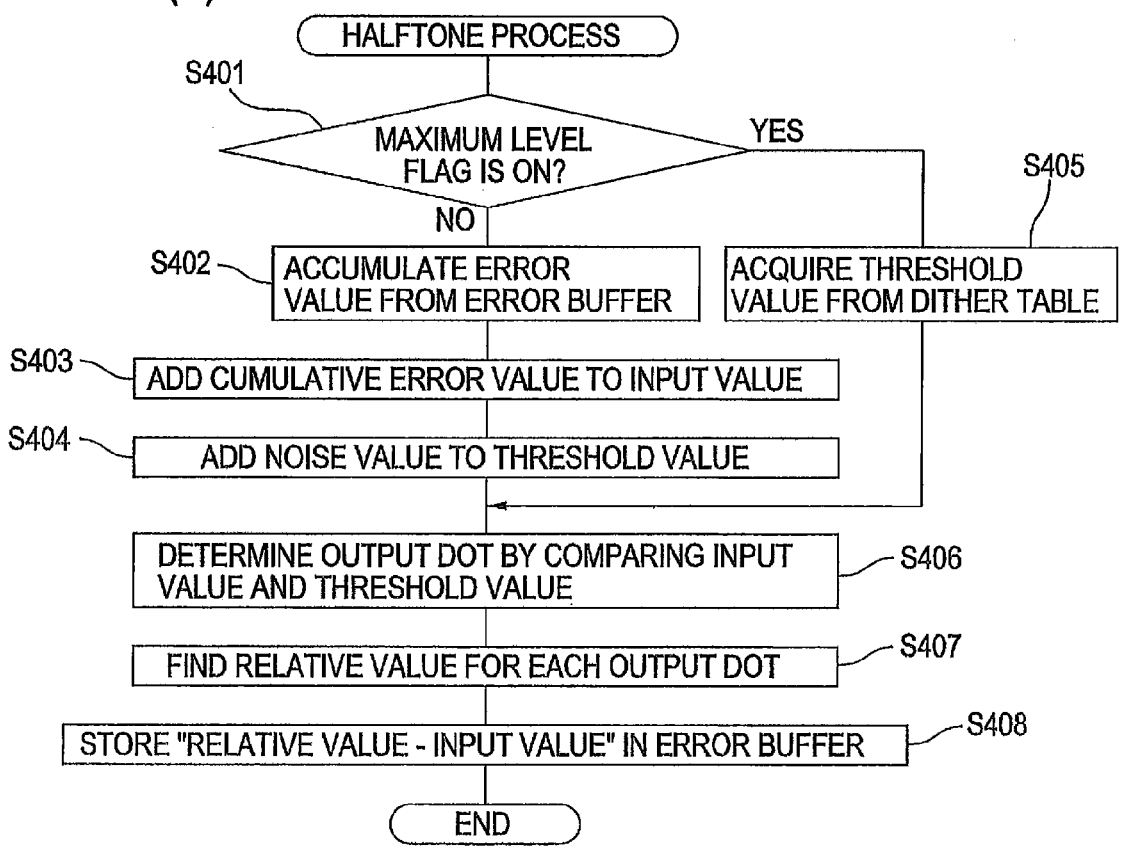
FIG. 14(b) is a flowchart illustrating steps in the halftone process.

In S228 the control unit 11 executes the same halftone process described in S218 (see FIG. 14(b)) on the reduced pixel values calculated in the final line reduction process of S226. Subsequently, the control unit 11 returns to S221.

When the control unit 11 determines in S221 that all pixels in the final line have been processed, the current image conversion process ends. On the other hand, if the control unit 11 determines in S220 that the line of RGB data is not an odd-numbered line (i.e., an even-numbered line), then the current image conversion process ends with no further steps.

3-3. Reduction Process

Figure 9:
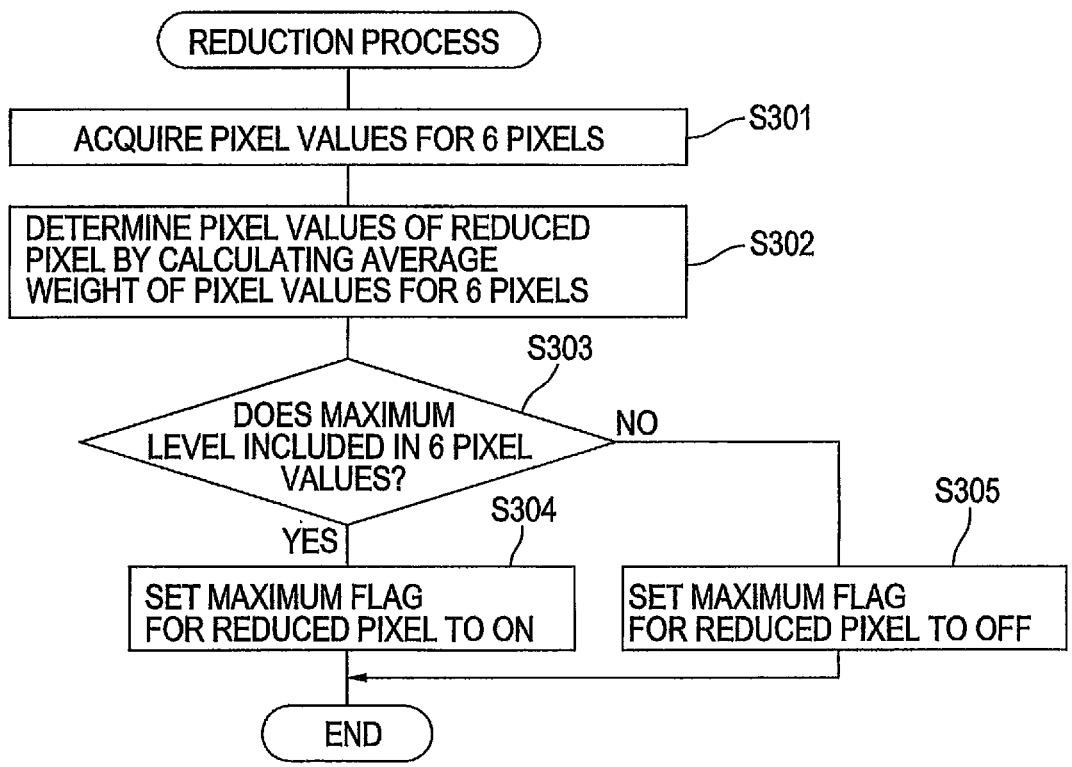
FIG. 9 is a flowchart illustrating steps in a reduction process of the image conversion process.

Next, the reduction process performed in S216 of the image conversion process described above (see FIG. 8) will be described with reference to the flowchart in FIG. 9. In S301 of FIG. 9 at the beginning of the reduction process, the control unit 11 acquires the values of pixels A-F indicated in FIG. 5(b), where F indicates the process pixel. Specifically, when processing the pixel in the $N^{th}$ position from the left of the target line (where N=0, 1, 2, . . . ), the value of pixel A is the value stored in the $N^{th}$ region of the first CMYK buffer 113a, the value of pixel B is stored in the $(N+1)^{th}$ region of the first CMYK buffer 113a, the value of pixel C is stored in the $N^{th}$ region of the second CMYK buffer 113b, the value of pixel D is stored in the $(N+1)^{th}$ region of the second CMYK buffer 113b, the value of pixel E is stored in the $N^{th}$ region of the third CMYK buffer 113c, and the value of pixel F is stored in the $(N+1)^{th}$ region of the third CMYK buffer 113c. As described above, the control unit 11 acquires, for a set of reduced pixel data, at least one set of CMYK pixel data satisfying a following condition that each of the at least one set of CMYK pixel data corresponds to the original pixel grid whose part is superposed on the grid of reduced image corresponding to the set of reduced pixel data when the reduced image is partially superposed on the original image such that the reduced image is shifted, from a position at which the reduced image is entirely superposed on the original image, by a prescribed length shorter than a length of one grid of original CMYK image as shown in FIG. 5(a).

In S302 the control unit 11 calculates the pixel value (output value) of a new pixel (a pixel in the reduced image) by calculating the average weight of values for pixels A-F acquired in S301 according to the following equation. In other words, the control unit 11 determines the pixel data by calculating the weighted average of the corresponding pixel data of CMYK image based on size ratio. The size ratio is defined as a size of the part of original CMYK grid that is superposed on the grid of reduced image to size of grid of the reduced image. In the following equation, A-F signify the values of pixels A-F, respectively.

Output value=$(A+B+C\times 2+D\times 2+E+F)/8$

In S303 the control unit 11 determines whether the values of pixels A-F include a maximum level. Specifically, the control unit 11 determines, for each set of CMYK pixel data in the reduced image data, whether or not at least one set of pixel data in the CMYK data corresponding to the set of reduced CMYK pixel data includes predetermined pixel data having maximum level. Here, "maximum level" denotes the highest level of CMYK values (ink ejection quantity) that can be inputted into the halftone process. When pixel values (CMYK values) are set to the maximum value (255 in the case of an 8-bit value), the quantity of ejected ink can be excessive in an inkjet-type printer 2. In such a case, the pixel value is sometimes set smaller than the maximum value. Therefore, the term "maximum level" used herein is not limited to the maximum value for CMYK values. In other words, the predetermined pixel data has at least one value among CMY values and K value that are greater than or equal to a prescribed value.

In this embodiment, CMYK values representing black (such as CMYK=(0, 0, 0, 255)) are considered the maximum level. Hence, if the control unit 11 determines in S303 that the values of pixels A-F include this maximum level, in S304 the control unit 11 sets a maximum level flag for the new pixel to ON and ends the reduction process. However, if the control unit 11 determines that the pixel values do not include the maximum level, in S305 the control unit 11 sets the maximum level flag for the new pixel to OFF and ends the reduction process. A maximum level flag is set for each pixel in the reduced image and is used in the halftone process described later with reference to FIG. 14. Further, the CMYK values representing black are not restricted to the above example in which all CMY values are "0", but may be configured of one or more of the CMY values being set to a value other than "0".

3-4. Final Line Reduction Process

Next, the final line reduction process performed in S226 of the image conversion process described above with reference to FIG. 8 will be described with reference to the flowchart in FIG. 10. The final line reduction process differs from the reduction process described above in the number of pixels referenced for calculating the output value of a new pixel (a pixel of the reduced image).

Figure 5B:
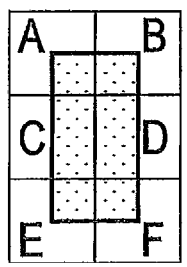
Figure 5C:
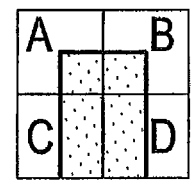
Figure 10:
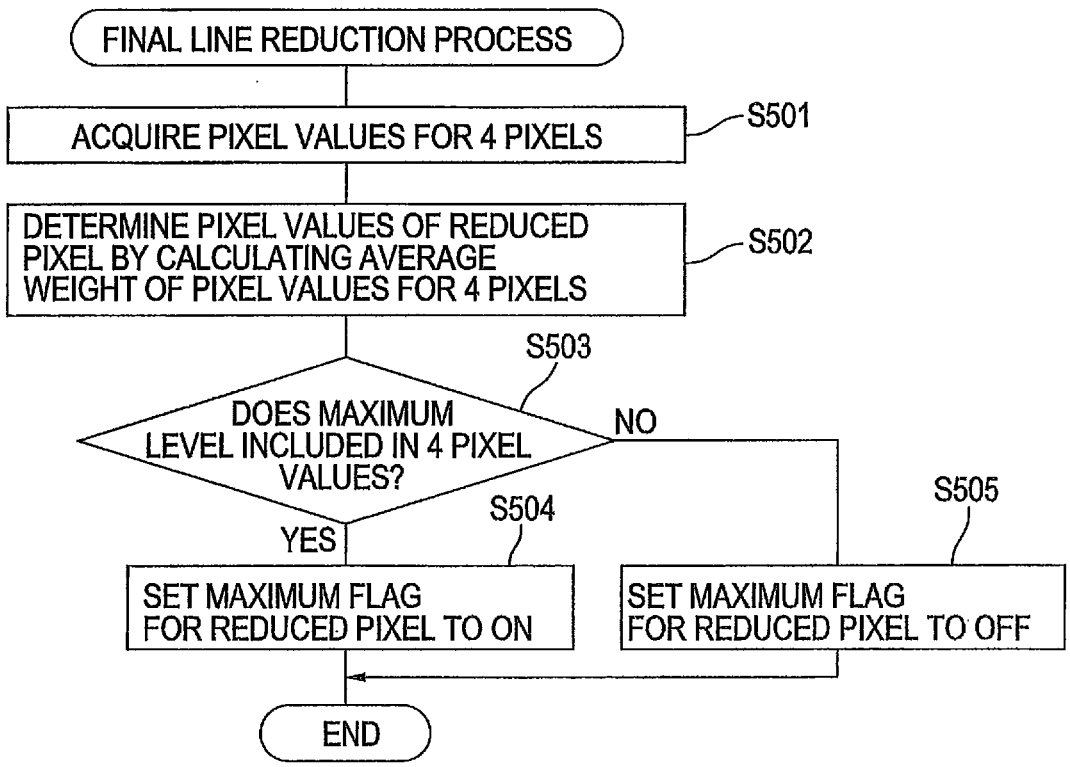
FIG. 10 is a flowchart illustrating steps in a final line reduction process of the image conversion process.

In S501 of FIG. 10 at the beginning of the final line reduction process, the control unit 11 acquires the values of pixels A-D shown in FIG. 5(c), where D indicates the target pixel. More specifically, when processing the $N^{th}$ pixel from the left in the final line (where N=0, 1, 2, . . . ), the value of pixel A is stored in the $N^{th}$ region of the first CMYK buffer 113a, the value of pixel B is stored in the $(N+1)^{th}$ region of the first CMYK buffer 113a, the value of pixel C is stored in the $N^{th}$ region of the second CMYK buffer 113b, and the value of pixel D is stored in the $(N+1)^{th}$ region of the second CMYK buffer 113b.

In S502 the control unit 11 calculates the value of the new pixel by calculating the weighted average of pixel values for pixels A-D calculated in S501 according to the following equation. In the following equation, A-D denote the values of pixels A-D.

Output value=$(A+B+C\times 2+D\times 2)/6$

In S503 the control unit 11 determines whether the values of pixels A-D include the maximum level. Hence, when the control unit 11 determines that the pixel values include the maximum level, in S504 the control unit 11 sets the maximum level flag for the new pixel to ON and ends the final line reduction process. However, if the control unit 11 determines that the pixel values do not include the maximum level, in S505 the control unit 11 sets the maximum level flag for the new pixel to OFF and ends the final line reduction process.

In other words, the plurality of sets of original pixel data are divided into a plurality of sets of line data having a first line data. The plurality of sets of line data indicates a plurality of line arranged in the second direction. Each set of line data includes first original pixel data and last original pixel data. The first original pixel data indicates a first original pixel. The last original pixel data indicates a last original pixel. The first original pixel and the second original pixel are arranged in the first direction. The first original pixel and the last original pixel corresponding to a first original grid and a last original grid. The control unit 11 produces the reduced image data by sequentially performing the reduction process on the original pixel data from the first original pixel data to the last original pixel data. The control unit 11 acquires at least one set of original pixel data for a set of reduced pixel data, the at least one set of original pixel data further satisfying a following condition that the at least one set of original pixel data corresponds to the original grid whose part is superposed on the reduced grid corresponding to the set of reduced pixel data when the reduced image is partially superposed on the original image such that the reduced image is shifted in the first direction defined from the last original grid to the first original grid.

3-5. Halftone Process

Next, the halftone process performed in S218 and S228 of the image conversion process described above with reference to FIG. 8 will be described. However, in order to facilitate understanding of the halftone process, the fundamental algorithms used in conventional halftone processes will be described prior to the description of the halftone process according to the preferred embodiment.

3-5-1. Error Diffusion Method

First, an algorithm for an error diffusion method (error accumulation method), one technique of a halftone process, will be described with reference to the block diagram in FIG. 11(a) and the flowchart in FIG. 11(b).

When performing a halftone process on a target pixel according to the error diffusion method, in S601 of FIG. 11(b) the control unit 11 first extracts error values from an error buffer using an error matrix. FIG. 11(c) shows an example of an error matrix in which weighting coefficients (the numbers 1, 3, 5, and 7 in this example) are associated with 12 peripheral pixels (all pixels that have been processed) defined for positions relative to a target pixel. The target pixel is indicated by the symbol "O". In S601 the control unit 11 multiplies the error value stored in the error buffer for each peripheral pixel (values stored in S606 described later) by the weighting coefficients set for the corresponding peripheral pixels and divides the sum of calculated values for all peripheral pixels by 48, which is the sum of the weighting coefficients, to obtain a cumulative error value (accumulative error value).

In S602 the control unit 11 adds the cumulative error value calculated in S601 to the value of the target pixel (input value). In S603 the control unit 11 sets random noise values and adds these noise values to predetermined fixed threshold values (threshold values at three stages used to produce one of four levels). While it is possible to perform a thresholding process without adding noise values, the addition of noise values is more effective for avoiding deterioration in the appearance of the image due to retardation, worms, or the like.

In S604 the control unit 11 sets an output dot by comparing the input value (the pixel value produced by adding the cumulative error in S602) to the threshold values (values produced by adding the noise values in S603). While one threshold value is used for setting a binary value, three threshold values are used in the preferred embodiment for setting the output dot to one of four levels. The input value is compared to the threshold values sequentially, beginning from the highest value. The control unit 11 sets the output dot to a large dot when the input value is greater than the largest threshold value, a medium dot when the input value is greater than the second largest threshold value, a small dot when the input value is greater than the third largest (i.e., the smallest) threshold value, and no dot for all remaining input values (i.e., input values less than or equal to the smallest threshold value).

In S605 the control unit 11 finds a relative value for each output dot set in S604. In other words, the control unit 11 sets the level of the output dot to a value converted for a range of input values. In the preferred embodiment, the control unit 11 sets a large dot to the maximum input value (255 for an 8-bit value) and sets medium and small dots to values based on their relation to the large dot. Although a large dot may be set to a value larger than the maximum value, there is little chance that large dots are printed. Further, the process of S605 may be omitted by finding relative values in advance.

In S606 the control unit 11 stores the value obtained by subtracting the relative value obtained in S605 from the input value acquired in S602 in the error buffer as the error value for the current target pixel.

3-5-2. Dithering and Fixed Threshold Method

Next, an algorithm for a dithering and fixed threshold method will be described with reference to the block diagram in FIG. 12(a) and the flowchart in FIG. 12(b). This method is a technique for a halftone process different from the error diffusion method. In this dithering method, the noise value generates irregularity smaller than an irregularity generated by the nose value in the error diffusion method as shown in FIG. 11.

When performing a halftone process on a target pixel according to a dithering method, in S701 of FIG. 12(b), the control unit 11 first produces threshold values from a dither table. The dither table (dither matrix) in the example shown in FIG. 12(c) is an 8×8 matrix holding different values in each cell. In the preferred embodiment, the halftone process employs a dither table possessing three threshold values for each position (referred to as "multi-value dithering") in order to convert input values to one of four values. For example, when the target pixel is the pixel at position (1, 1), the control unit 11 extracts the values 0, 84, and 170 as the threshold values. Since images being printed are generally larger than 8×8 pixels, these dither tables are used repeatedly over the image.

On the other hand, when performing a halftone process according to the fixed threshold method, unlike in the dither method, the same threshold values (such as 42, 126, and 213) are used for each target pixel regardless of the pixel position.

In S702 the control unit 11 sets an output dot by comparing the input value to the threshold values. The method of setting output dots based on the three threshold values is identical to that described in S604 of the error diffusion method.

3-5-3. Modified Error Diffusion Method

Figure 13A:
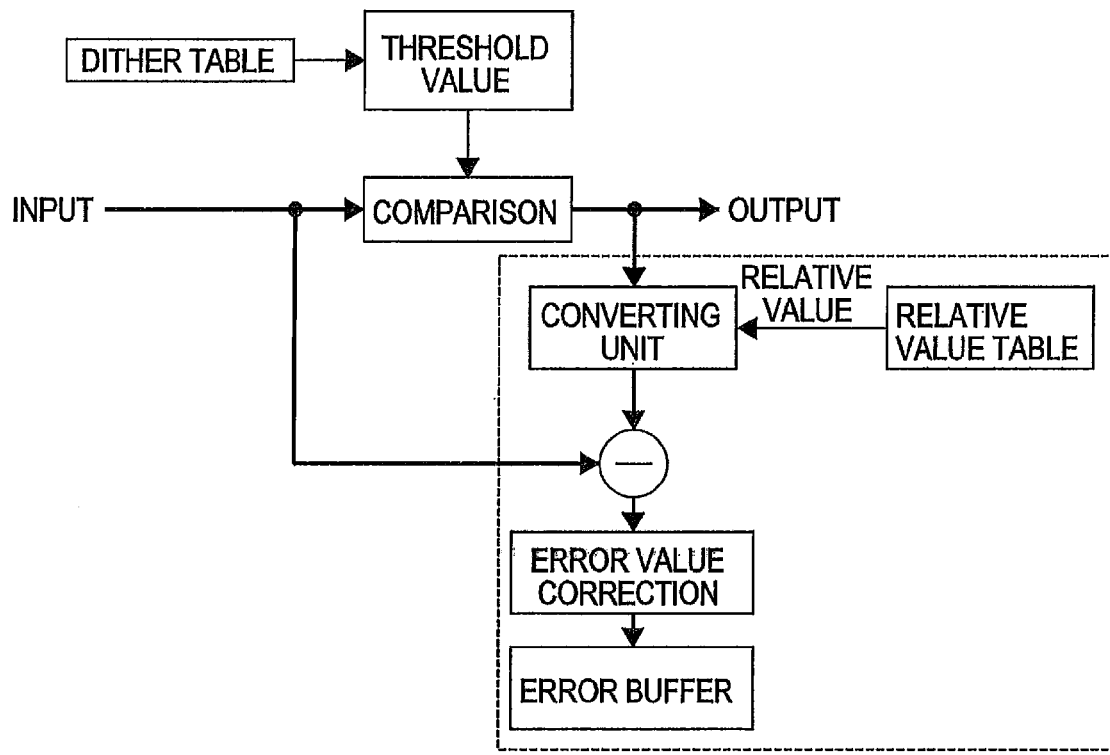
FIG. 13(a) is an explanatory diagram showing an algorism for a modified error diffusion method.

Next, an algorithm unique to the preferred embodiment will be described with reference to the block diagram in FIG. 13(a) and the flowchart in FIG. 13(b). This algorithm is used in an error diffusion method (hereinafter referred to as a "modified error diffusion method") for determining values according to a dithering and fixed threshold method, without error feedback, and for accumulating error based on the determined values. As will be described later, in the preferred embodiment the control unit 11 performs a halftone process according to the conventional error diffusion method (see FIG. 11) when the pixels in the original image corresponding to the target pixel of the halftone process do not include pixel values of the maximum level, and performs a halftone process according to the modified error diffusion method (see FIG. 13) when the pixels in the original image include values of the maximum level. This modified error diffusion method is configured for performing a process to record error data to the error buffer (the process steps within the dotted box in FIG. 13(a)) during the halftone process according to the dithering and fixed threshold method described above (see FIG. 12).

Figure 13B:
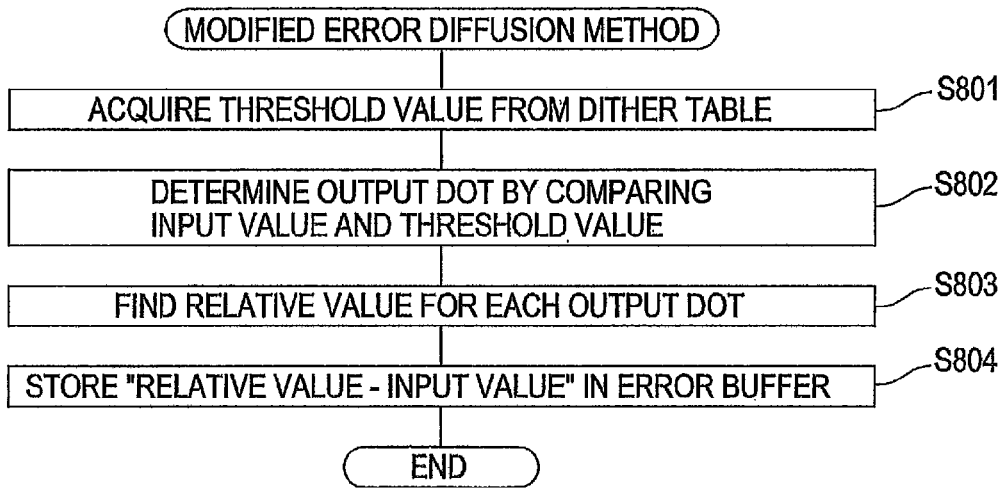
FIG. 13(b) is a flowchart illustrating steps in the modified error diffusion method.

Hence, in the flowchart of FIG. 13(b), the processes in S801 and S802 are identical in content to the processes in S701 and S702 of the dithering and fixed threshold method described above (see FIG. 12(b)). In other words, the control unit 11 sets output dots by comparing input values to threshold values.

Further, the subsequent processes in S803 and S804 are identical in content to the processes in S605 and S606 of the error diffusion method described earlier (see FIG. 11(b)). In other words, the control unit 11 records a value obtained by subtracting the relative value of the output dot from the input value in the input buffer as the error value for the target pixel.

3-5-4. Halftone Process of this Embodiment

Next, the halftone process of this embodiment performed in S218 and S228 of the image conversion process described above (see FIG. 8) will be described with reference to the block diagram in FIG. 14(a) and the flowchart in FIG. 14(b) based on the algorithms described above. The halftone process performed in S218 targets a new pixel having the pixel values calculated in S216, while the halftone process performed in S228 targets a new pixel having the pixel values calculated in S226.

At the beginning of the halftone process in S401 of FIG. 14(b), the control unit 11 determines whether the maximum level flag for the target pixel is ON. If the control unit 11 determines in S401 that the maximum level flag is not ON (i.e., is OFF), then the control unit 11 executes the processes in S402-S404 and S406-S408 before ending the halftone process. That is, when the control unit 11 determines that all sets of at least one set of CMYK pixel data corresponding to the each set of CMYK pixel data in the reduced image data does not include the maximum level data, the control unit 11 performs the processes in S402-S404 and S406-S408. The details of these steps are identical in content to S601-S606 of the error diffusion method described above (see FIG. 11(b)). In other words, the control unit 11 performs a halftone process according to the conventional error diffusion method on pixels whose maximum level flag is OFF.

However, if the control unit 11 determines in S401 that the maximum level flag is ON, then the control unit 11 executes the processes in S405-S408 and subsequently ends the halftone process. The details of these steps are identical in content to S801-S804 of the modified error diffusion method described above (see FIG. 13(b)). In other words, the control unit 11 performs a halftone process according to the modified error diffusion method on pixels whose maximum level flag is ON. Therefore, the control unit 11 produces output image data indicative of an output image having a plurality of pixels. Each set of output pixel data indicates whether or not a dot is to be formed in the corresponding pixel by determining a dot among the large dot, medium dot, small dot, and no dot. In other words, the second method performing the processes of S402-S404 and S406-S408 is different from the fist method performing the processes of S405 such that dots in a first output image is more irregularly formed than a second output image. The first output image is generated by the first halftone method when the selecting unit selects the first halftone method for all sets of scaled pixel data. The second output image is generated by the second halftone method when the selecting unit selects the second halftone method for all sets of scaled pixel data.

4. Effects of the Invention

As described above, since the personal computer 1 of the embodiment is configured to offset the superposed position of the reduced image relative to the original image in the reduction process by an amount smaller than a unit pixel in the original image (see FIG. 5(a)), the personal computer 1 combines the values of pixels in the edges of characters, graphics, and the like with values of pixels in the background prior to the reduction process based on their area ratios with the pixel in the reduced image (see FIGS. 5(b) and 5(c)). This makes the edges of characters, graphics, and the like in the reduced image appear smoother, thereby reducing such phenomena as thin lines appearing broken, for example. Accordingly, the personal computer 1 can avoid the phenomenon in which the reduction process worsens the appearance of edges in characters, graphics (lines, etc.), and the like expressed in black. Since black text and black graphics are commonly used in most office documents (data generated using office software, such as spreadsheet data), improving the appearance of the edges of these black characters and graphics is more effective for improving image quality.

The personal computer 1 according to the preferred embodiment can also reduce changes in the appearance from the original image to the reduced image, such as the thickening of thin lines. For example, when the line width in the original (number of pixels in the y direction in this example) is even (six pixels in this example), as shown in FIG. 15, in the conventional technique the line width in the reduced image may become four pixels (50%, 100%, 100%, 50%) or three pixels (100%, 100%, 100%) depending on the position of the line in the image. Since none of the pixels are blurred when the line results in three pixels (all 100%) while pixels at both ends of the line are blurred (not 100%) when the line results in four pixels, the thickness of lines in the reduced image may appear greatly different from the original. In contrast, the personal computer 1 according to the preferred embodiment sets lines in the reduced image to four pixels, regardless of the position of the line in the image, and pixels on both ends of the lines are blurred. Accordingly, the thicknesses of lines in the reduced image appear the same.

However, when the line width in the original image is an odd number of pixels (five pixels in this example), the conventional technique sets the line width in the reduced image to three pixels, regardless of the position of the line within the image and blurs the pixels on both ends of the line. Accordingly, the thicknesses of lines in the reduced image appear the same. In the preferred embodiment, the personal computer 1 sets the line width in the reduced image to three pixels (75%, 100%, 75%) or four pixels (25%, 100%, 100%, 100%, 25%) depending on the position of the line in the image. However, since the pixels on both ends of the line are only weakly blurred in the case of three pixels (75%) and strongly blurred in the case of four pixels (25%), visually the lines appear to have an equivalent thickness.

The personal computer 1 of the preferred embodiment also sets the superposed position such that the reduced image is offset slightly from the original image in both the x and y directions of the original image. This reduces the likelihood of thin lines appearing to change in thickness, regardless of the angle of the thin line in the original image, such as a sloped line approaching the vertical or a sloped line approaching the horizontal. This process reduces the chance that the appearance of the original image will be changed in the reduced image, such as when thin lines appear fatter due to reducing the original image by two or more times.

Further, the personal computer 1 according to the preferred embodiment is configured to perform the process for calculating pixel values in the reduced image along the x direction of the original image and to offset the position at which the reduced image overlaps the original image at least in the y direction of the original image toward the side at which the calculation process begins (i.e., upward). Therefore, the personal computer 1 can more quickly begin the calculation process than if the reduced image were offset in the y direction of the original image toward the side opposite the side for beginning the calculation process (i.e., downward). In a process for reducing a 600×600 dpi image to a 600×300 dpi image, for example, the personal computer 1 can output 300 dpi data when processing two lines at 600 dpi. Since the personal computer 1 can process lines in integer multiples, such as 2, 4, 6, . . . , the personal computer 1 need not allocate memory buffers excessively.

The personal computer 1 according to the preferred embodiment calculates pixels values in a reduced image when the overlapping position of the reduced image is offset relative to the original image by setting the values of pixels in the original image for the region in which the reduced image extends beyond the original image to the same values as the neighboring pixels in the original image (S206-S211, S213, S214, S223, S224). Hence, the personal computer 1 can set values of pixels in the reduced image extending beyond the original image simply by adding pixel values in the original image.

The personal computer 1 of the preferred embodiment performs a halftone process according to the conventional error diffusion method (S402-S404, S406-S408) when the values of pixels in the original image corresponding to the pixel of the original image targeted in the halftone process do not include the maximum level (CMYK values for rendering black in the preferred embodiment) and performs a halftone process according to a modified error diffusion method (S405-S408) when the pixel values of the original image include the maximum level. By using different halftone processes in this way, the personal computer 1 can reduce the likelihood that an enlargement or reduction process will worsen the appearance of edges in characters, graphics, and the like as a result of the halftone process. Since the halftone process is performed to reduce irregularities in dots among pixels in characters, graphics, and the like for pixels of an original image that have been rendered by setting the values of colorants greater than or equal to a prescribed maximum level, the personal computer 1 minimizes the chance of the halftone process worsening the appearance of such characters, graphics, and the like.

If the original image includes a line L1 rendered in black and a line L2 rendered in an intermediate gray level, as in the example shown in FIG. 16, dots produced for line L1 in the halftone process are unlikely to be erratic since the halftone process renders dots regularly in four levels, even though the reduction process converts the edges to intermediate grays. On the other hand, dots forming line L2 are more likely to be produced in irregular levels. However, since objects commonly rendered in the maximum level of black are generally characters, lines of tables, and the like and since characters and lines in colors other than black are seldom rendered in single colors, there are a few cases in which the edges of such characters and lines appear jagged.

Further, in the modified error diffusion method of the preferred embodiment, the personal computer 1 sets pixel values using a dithering or fixed threshold method with no error feedback and performs a halftone process according to an error diffusion method to accumulate error based on the values set in the dithering or fixed threshold method. Accordingly, the personal computer 1 can more smoothly switch between conventional error diffusion methods than when simply performing a halftone process according to a dithering or fixed threshold method.

While the invention has been described in detail with reference to the embodiment thereof, it would be apparent to those skilled in the art that various changes and modifications may be made therein without departing from the spirit of the invention.

6-1. Light Ink

In the preferred embodiment described above, light cyan and light magenta are used as examples of the light ink. However, light ink in other light colors, such as light gray, may be used in addition to or in place of these colors.

6-2. Direction and Ratio of Reduction

Figures 17A, 17B:
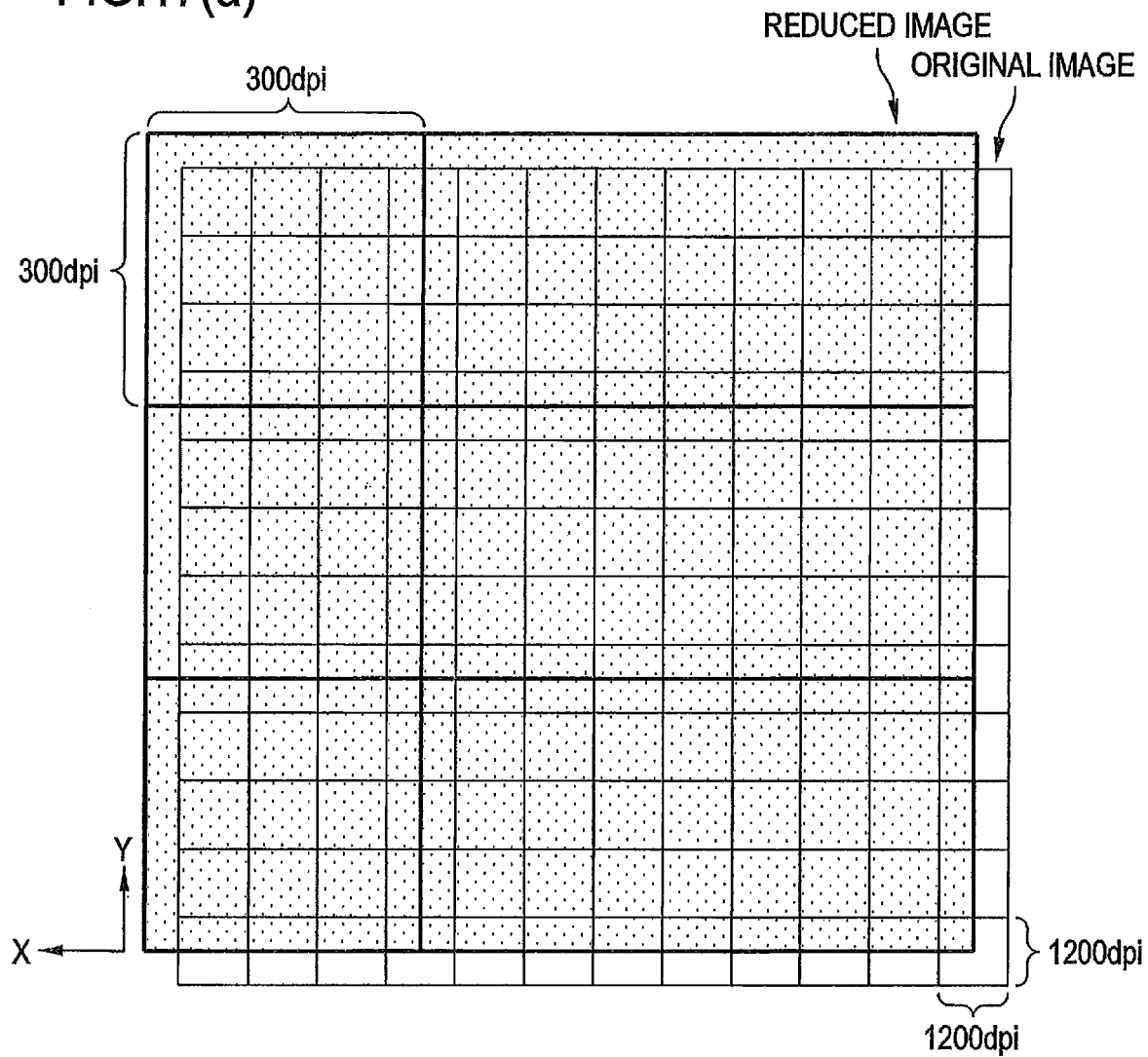
FIGS. 17(a) and 17(b) are explanatory diagrams showing a relationship between an original image and an reduced image according to a modification.

In the preferred embodiment described above, the original image is reduced by two times only in the y direction (sub-scanning direction; see FIG. 5(*a*)), but the direction and ratio of reduction are not limited to this example. As shown in FIG. 17(*a*), the original image may be rasterized at 1200×1200 dpi for a printing resolution of 300×300 dpi and subsequently reduced by four times in both the x direction (main-scanning direction) and y direction based on an overlapping position in which the reduced image is offset by 0.5 pixels leftward in the x direction and upward in the y direction based on the unit pixel of the original image (1200 dpi). In this case, the control unit 11 calculates pixel values (output values) of pixels in the reduced image by calculating a weighted average of pixel values for pixels A-Y shown in FIG. 17(*b*) using the following equation. In this equation, A-Y denote the values of pixels A-Y.

$$\text{Output value} = (A + B \times 2 + C \times 2 + D \times 2 + E + F \times 2 + G \times 4 + H \times 4 + I \times 4 + J \times 2 K \times 2 + L \times 4 + M \times 4 + N \times 4 + O \times 2 + P \times 2 + Q \times 4 + R \times 4 + S \times 4 + T \times 2 + U + V \times 2 + W \times 2 + X \times 2 + Y)/64$$

Further, in the embodiment described above, the control unit 11 is configured to rasterize image data targeted for printing at a higher resolution than the actual printing resolution. However, it is also possible to rasterize the image data at the printing resolution and subsequently to reduce the data by one time, while the superposed position of the reduced image is shifted relative to the original image. This method can also make edges of characters, graphics, and the like in the reduced image appear smoother.

In the embodiment described above, the example of the reduction process is one performed in an anti-aliasing process, but the present invention may also be applied to reduction processes other than those performed in anti-aliasing processes.

6-3. Superposed Position of the Reduced Image Relative to the Original Image

In the reduction process of the preferred embodiment described above, the superposed position of the reduced image relative to the original image is offset not only in the y direction in which the reduction process is performed, but also in the x direction in which the reduction process is not performed (see FIG. 5(*a*)), but the present invention is not limited to this superposed position. For example, the reduced image may be shifted only in the direction in which the reduction process is performed.

Figure 18A:
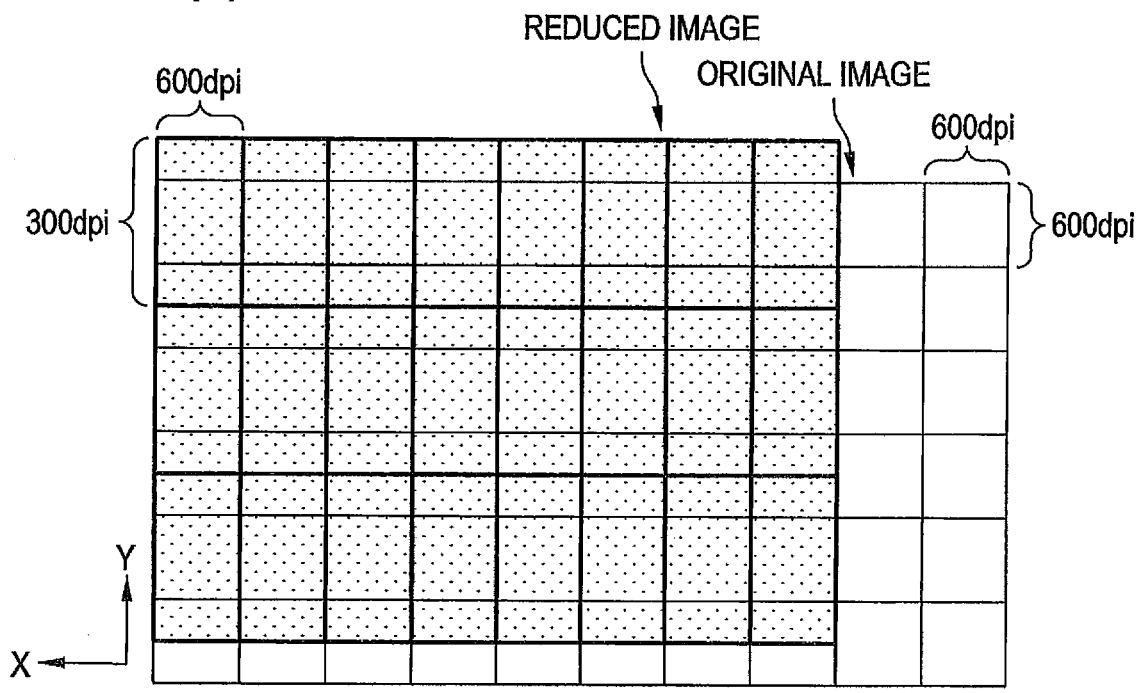
FIGS. 18(a) and 18(b) are explanatory diagrams showing a relationship between an original image and a reduced image according to another modification.
Figure 18B:
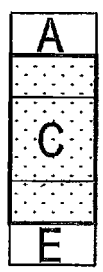

Specifically, as shown in FIG. 18(*a*), the control unit 11 rasterizes image data at 600×600 dpi for a printing resolution of 600×300 dpi and subsequently reduces the original image by two times in the y direction based on the superposed position of the reduced image offset 0.5 pixels upward in the y direction based on a unit pixel in the original image (600 dpi). In this case, the control unit 11 calculates the output value of a pixel in the reduced image by calculating the weighted average of pixel values for pixels A, C, and E shown in FIG. 18(*b*) based on the equation below. In the following equation, A, C, and E denote the values of pixels A, C, and E.

$$\text{Output value} = (A + C \times 2 + E)/4$$

Since the image becomes coarser in the direction that the reduction process is performed (the direction that the image is reduced), it is more effective for making the reduced image appear smoother when offsetting the reduced image relative to the original image at least in the direction that the reduction process is performed among the x and y directions of the image.

Further, the superposed position of the reduced image relative to the original image may be offset in the direction corresponding to the direction in which the recording head 27 moves relative to the paper P when ejecting ink droplets (the main scanning direction; the x direction in the preferred embodiment). That is, irregularities in the positions of dots formed by ink droplets is likely to occur in the direction that the recording head 27 moves relative to the paper P when ejecting ink droplets. However, since pixel values in intermediate tones are more apt to be generated in the edges of characters, graphics, and the like in the direction that the superposed position is shifted, it is more likely that discretely distributed dots will be formed in the halftone process and, hence, it is more likely that irregularities in dot positions will be even more noticeable when the superposed position is shifted in the direction of relative movement between the recording head 27 and the paper P. Accordingly, such irregularities in dot positions can be made less noticeable by shifting the superposed position only a direction different from this direction of relative movement.

Further, the direction for shifting the superposed position of the reduced image relative to the original image is not limited to left in the x direction and up in the y direction, but may also be right in the x direction and down in the y direction.

Further, the distance in which the superposed position of the reduced image is shifted relative to the original image is not limited to 0.5 pixels based on a unit pixel in the original image. However, when dividing the original image uniformly for calculating pixel values in the reduced image, an offset of 0.5 pixels as described in the preferred embodiment is preferable.

Further, it is not necessary to shift the superposed position of the reduced image relative to the original image.

6-3. Region of the Reduced Image Extending Off the Original Image

In the preferred embodiment described above, the values of pixels in the original image for the region in which the reduced image extends beyond the original image due to the offset superposed position of the reduced image are set to the same values as the neighboring pixels in the original image (S206-S211, S213, S214, S223, S224). However, the present invention is not limited to this method of setting pixel values.

For example, the control unit 11 may calculate values of pixels in the original image for the region of the reduced image that extends beyond the original image using a function based on pixel values of the original image (interpolation or other calculation).

Alternatively, the control unit 11 may set all pixel values of the original image for the region in which the reduced image extends beyond the original image to "0", for example. This can be accomplished by not performing the processes in S206-S211, S213, S214, S223, and S224 in the image conversion process of FIG. 9, since the values in the CMYK buffer are initialized to "0" in S201 and S219. Since the pixel values for end parts of images, such as documents, are normally "0", the process can be simplified in this way while still attaining the same effects described in the preferred embodiment.

6-4. Maximum Level

In the preferred embodiment described above, the maximum level denotes only CMYK values for rendering black. However, the maximum level may denote CMYK values for rendering a color at its maximum saturation in addition (or instead of) the CMYK values for rendering black, for example.

In the embodiment described above, the image conversion process is performed in the order color conversion process→reduction process→halftone process, but this order may be modified to reduction process→color conversion process→halftone process. In the latter case, the original image is reduced while still expressed in RGB data. Here, it is possible to determine the maximum level for RGB pixel values as the RGB values that will produce the maximum level of CMYK values when the pixel values prior to the reduction process (RGB values) are converted to CMYK values. However, such determinations necessitate referencing an LUT during the reduction process, which will result in a high processing load. The maximum level can be determined more simply according to the following method.

The control unit 11 may determine that a pixel has the maximum level when the pixel values are RGB=(0, 0, 0) (i.e, pixel values for rendering black), for example. Further, pixel values for the six primary colors RGBCMY and K may be determined to be the maximum level when the RGB values are configured only of a maximum value (255 for an 8-bit value) and a minimum value (0), for example, excluding the case of RGB=(255, 255, 255) (i.e., white). Further, the maximum level can be determined for each of plurality of color materials.

Alternatively, the maximum level of pixel values can be determined based on values in a color wheel that shows gradual changes among the six primary colors RGBCMY when RGB values include both a maximum value (255 in the case of an 8-bit value) and a minimum value (0), for example.

When the image conversion process is performed in the order color conversion process→reduction process→halftone process, the control unit 11 may be configured to change the halftone process for each of the CMYK colors in each pixel of an image targeted for the halftone process based on a maximum level set for each of the CMYK colors. In other words, the halftone process itself can be performed independently for each color and can be switched based on the maximum level for each of the CMYK colors. In this way, the control unit 11 can employ different halftone processes for each of the CMYK colors in the same pixel, thereby selecting more suitable halftone processes. The control unit 11 may be configured to set a maximum level flag for each color in each pixel of the reduced image to the value 255, indicating the maximum level for each of the CMYK colors, for example.

6-5. Halftone Process

In the preferred embodiment described above, the control unit 11 performs a halftone process according to the conventional error diffusion method (see FIG. 11) when values of pixels in the original image corresponding to the target pixel of the halftone process do not include the maximum level, and performs a halftone process according to the modified error diffusion method (see FIG. 13) when these pixel values include the maximum level, but the present invention is not limited to this method.

For example, the control unit 11 may be configured to perform a halftone process according to an error diffusion method in which error values are added to the threshold values as described in the preferred embodiment (see FIG. 11) when the values of pixels in the original image corresponding to the target pixel of the halftone process do not include the maximum level, and to perform a halftone process according to an error diffusion method that uses noise values with less effect than in the method of FIG. 11 when the pixel values include the maximum level. The error diffusion method having a smaller noise value effect may be achieved by reducing the intensity (amplitude, frequency) of randomly generated noise values, and may include setting the noise value to "0" (i.e., not adding a noise value).

Further, while the control unit 11 is configured to add noise values to threshold values in the preferred embodiment, the control unit 11 may instead add noise values to the input values, for example. Further, while the control unit 11 randomly sets noise values in the preferred embodiment, the noise values may be set to periodically-arranged values.

Alternatively, the control unit 11 may be configured to perform a halftone process according to the error diffusion method (FIG. 11) when values of pixels in the original image corresponding to the target pixel of the halftone process do not include the maximum level, and to perform a halftone process according to the dithering and fixed threshold method (FIG. 12) when the pixel values of the original image include the maximum level.

Alternatively, the same halftone process may be performed, regardless of whether the pixel values in the original image corresponding to the target pixel include the maximum level.

6-6. Enlargement Process

In the preferred embodiment described above, the present invention is applied to an example of a reduction process based on the average pixel method. However, the same effects can be obtained when applying the present invention to an enlargement process based on a bilinear method or a bicubic method, for example. In other words, the control unit 11 may perform a process according to an enlargement method or a reduction method for associating each pixel in an enlarged image or a reduced image resulting from an enlargement process or a reduction process with one or more pixels in the original image, and for calculating pixel values in the enlarged image or reduced image by combining (averaging, interpolating, etc.) values of pixels in the original image corresponding to a pixel in the enlarged image or reduced image.

6-7. Image-Forming Device

In the embodiment described above, the image-forming device of the present invention is described as a serial printer that ejects ink droplets from a reciprocating recording head. However, the present invention may also be applied to a line printer having a recording head that spans the entire width of a recording medium for ejecting ink droplets on the recording medium while moved relative thereto, for example. While the printer 2 in the preferred embodiment described above can produce dots in four levels, the present invention may be applied to a printer capable of rendering dots in only two levels, for example. Further, while the present invention is applied to a technique for generating image data for use in an inkjet-type image-forming device, the present invention may also be applied to a technique for generating image data for use in an electrophotographic or other type of image-forming device. Alternatively, the present invention may be applied to a technique for generating image data representing an image to be formed on an image-forming device other than a printer, such as electronic paper or another display device having a lower resolution than a common display.

6-8. Implementing Agent of the Image Conversion Process

In the embodiment described above, the image conversion process in FIG. 8 is executed on the personal computer 1, but the process may be implemented on the printer 2 instead, for example.

What is claimed is:

1. An image processing device comprising:
a converting unit that is configured to convert original image data to converted image data by performing a scaling process and a color conversion process on the original image data, the original image data including a plurality of sets of original pixel data, the converted image data including a plurality of sets of converted pixel data, each set of converted pixel data corresponding to at least one set of original pixel data, the converting unit producing each set of converted pixel data based on the corresponding at least one set of original pixel data, each set of converted pixel data including a plurality of color values, the plurality of color values corresponding to a plurality of color materials, each color value indicating an amount of one of the plurality of color materials;
a determining unit that is configured to determine, for each set of converted pixel data, whether or not at least one set of original pixel data corresponding to the each set of converted pixel data includes predetermined pixel data;
a halftone unit that is configured to produce output image data based on the converted image data, the halftone unit including:
a selecting unit that is configured to select, for each set of converted pixel data, a first halftone method when the determining unit determines that no set of original pixel data corresponding to the each set of converted pixel data includes the predetermined pixel data, and a second halftone method different from the first halftone method when the determining unit determines that the at least one set of original pixel data corresponding to the each set of converted pixel data includes the predetermined pixel data; and
a pixel data halftone unit that is configured to produce a set of output pixel data for each set of converted pixel data in accordance with one of the first halftone method and the second halftone method selected by the selecting unit; and
a transmitting unit that is configured to transmit the output image data to an image forming unit, the image forming unit forming the output image on a recording medium based on the output image data, the image forming unit reproducing a plurality of colors that is contained in a prescribed color range, the plurality of colors having a plurality of saturations,
wherein the predetermined pixel data represents a color having a saturation largest among the plurality of saturations.

2. An image processing device comprising:
a converting unit that is configured to convert original image data to converted image data by performing a scaling process and a color conversion process on the original image data, the original image data including a plurality of sets of original pixel data, the converted image data including a plurality of sets of converted pixel data, each set of converted pixel data corresponding to at least one set of original pixel data, the converting unit producing each set of converted pixel data based on the corresponding at least one set of original pixel data, each set of converted pixel data including a plurality of color values, the plurality of color values corresponding to a plurality of color materials, each color value indicating an amount of one of the plurality of color materials;
a determining unit that is configured to determine, for each set of converted pixel data, whether or not at least one set of original pixel data corresponding to the each set of converted pixel data includes predetermined pixel data; and a halftone unit that is configured to produce output image data based on the converted image data, the halftone unit including:

a selecting unit that is configured to select, for each set of converted pixel data, a first halftone method when the determining unit determines that no set of original pixel data corresponding to the each set of converted pixel data includes the predetermined pixel data, and a second halftone method different from the first halftone method when the determining unit determines that the at least one set of original pixel data corresponding to the each set of converted pixel data includes the predetermined pixel data; and a pixel data halftone unit that is configured to produce a set of output pixel data for each set of converted pixel data in accordance with one of the first halftone method and the second halftone method selected by the selecting unit, wherein the first halftone method is an error diffusion method, wherein each set of converted pixel data represents a converted value, wherein the pixel data halftone unit includes:

a comparing unit that is configured to determine a set of output pixel data for each set of converted pixel data by comparing a converted value corresponding to the each set of converted pixel data to a threshold value; and a noise adding unit that is configured to add a noise value to at least one of the converted value and the threshold value when the comparing unit compares the converted value to the threshold value, and wherein, when the selecting unit selects the second halftone method, the noise value generates an irregularity smaller than an irregularity generated by the noise value when the selecting unit selects the first halftone method.

3. An image processing device comprising:

a converting unit that is configured to convert original image data to converted image data by performing a scaling process and a color conversion process on the original image data, the original image data including a plurality of sets of original pixel data, the converted image data including a plurality of sets of converted pixel data, each set of converted pixel data corresponding to at least one set of original pixel data, the converting unit producing each set of converted pixel data based on the corresponding at least one set of original pixel data, each set of converted pixel data including a plurality of color values, the plurality of color values corresponding to a plurality of color materials, each color value indicating an amount of one of the plurality of color materials;

a determining unit that is configured to determine, for each set of converted pixel data, whether or not at least one set of original pixel data corresponding to the each set of converted pixel data includes predetermined pixel data; and a halftone unit that is configured to produce output image data based on the converted image data, the halftone unit including:

a selecting unit that is configured to select, for each set of converted pixel data, a first halftone method when the determining unit determines that no set of original pixel data corresponding to the each set of converted pixel data includes the predetermined pixel data, and a second halftone method different from the first halftone method when the determining unit determines that the at least one set of original pixel data corresponding to the each set of converted pixel data includes the predetermined pixel data; and a pixel data halftone unit that is configured to produce a set of output pixel data for each set of converted pixel data in accordance with one of the first halftone method and the second halftone method selected by the selecting unit, wherein the first halftone method is an error diffusion method, wherein the second halftone method is a dithering method, and wherein the pixel data halftone unit includes:

an error determining unit that is configured to determine an error value by comparing the each output value to the corresponding threshold value when the selecting unit selects the second halftone method; and an error value storing unit that is configured to store the error value when the selecting unit selects the second halftone method instead of sending the error value to the noise adding unit.

4. An image processing device comprising:

a converting unit that is configured to convert original image data to converted image data by performing a scaling process and a color conversion process on the original image data, the original image data including a plurality of sets of original pixel data, the converted image data including a plurality of sets of converted pixel data, each set of converted pixel data corresponding to at least one set of original pixel data, the converting unit producing each set of converted pixel data based on the corresponding at least one set of original pixel data, each set of converted pixel data including a plurality of color values, the plurality of color values corresponding to a plurality of color materials, each color value indicating an amount of one of the plurality of color materials;

a determining unit that is configured to determine, for each set of converted pixel data, whether or not at least one set of original pixel data corresponding to the each set of converted pixel data includes predetermined pixel data; and a halftone unit that is configured to produce output image data based on the converted image data, the halftone unit including:

a selecting unit that is configured to select, for each set of converted pixel data, a first halftone method when the determining unit determines that no set of original pixel data corresponding to the each set of converted pixel data includes the predetermined pixel data, and a second halftone method different from the first halftone method when the determining unit determines that the at least one set of original pixel data corresponding to the each set of converted pixel data includes the predetermined pixel data; and a pixel data halftone unit that is configured to produce a set of output pixel data for each set of converted pixel data in accordance with one of the first halftone method and the second halftone method selected by the selecting unit, wherein the first halftone method is an error diffusion method, wherein the second halftone method is a fixed threshold method, and wherein the pixel data halftone unit includes:
  an error determining unit that is configured to determine an error value by comparing the each output value to the corresponding threshold value when the selecting unit selects the second halftone method; and
  an error value storing unit that is configured to store the error value when the selecting unit selects the second halftone method instead of sending the error value to the noise adding unit.

5. An image processing device comprising:
  a converting unit that is configured to convert original image data to converted image data by performing a scaling process and a color conversion process on the original image data, the original image data including a plurality of sets of original pixel data, the converted image data including a plurality of sets of converted pixel data, each set of converted pixel data corresponding to at least one set of original pixel data, the converting unit producing each set of converted pixel data based on the corresponding at least one set of original pixel data, each set of converted pixel data including a plurality of color values, the plurality of color values corresponding to a plurality of color materials, each color value indicating an amount of one of the plurality of color materials;
  a determining unit that is configured to determine, for each set of converted pixel data, whether or not at least one set of original pixel data corresponding to the each set of converted pixel data includes predetermined pixel data; and
  a halftone unit that is configured to produce output image data based on the converted image data, the halftone unit including:
    a selecting unit that is configured to select, for each set of converted pixel data, a first halftone method when the determining unit determines that no set of original pixel data corresponding to the each set of converted pixel data includes the predetermined pixel data, and a second halftone method different from the first halftone method when the determining unit determines that the at least one set of original pixel data corresponding to the each set of converted pixel data includes the predetermined pixel data; and
    a pixel data halftone unit that is configured to produce a set of output pixel data for each set of converted pixel data in accordance with one of the first halftone method and the second halftone method selected by the selecting unit,
  wherein each set of original pixel data includes a first color value and a second color value, the first color value corresponding to a first color material, a second color value corresponding to a second color material different from the first color material, the plurality of color materials including the first color material and the second color material,
  wherein the determining unit determines, for each set of converted pixel data, whether or not the first color value of at least one set of original pixel data corresponding to the each set of converted pixel data is greater than or equal to a first predetermined pixel value, the first predetermined pixel value corresponding to the first color material,
  wherein the determining unit determines, for each set of converted pixel data, whether or not the second color value of at least one set of original pixel data corresponding to the each set of converted pixel data is greater than or equal to a second predetermined pixel value, the second predetermined pixel value corresponding to the second color material,
  wherein the selecting unit selects, for each set of converted pixel data, the first halftone method for the first color material when the determining unit determines that all first color value is not greater than or equal to the first predetermined pixel value, and the second halftone method for the first color material when the determining unit determines that at least one first color value is greater than or equal to the first predetermined pixel value,
  wherein the selecting unit selects, for each set of converted pixel data, the first halftone method for the second color material when the determining unit determines that all first color value is not larger than or equal to the second predetermined pixel value, and the second halftone method for the second color material when the determining unit determines that at least one first color value is greater than or equal to the second predetermined pixel value, and
  wherein the pixel data halftone unit produces a set of output pixel data for each set of converted pixel data by producing a first output pixel value based on the first color value in accordance with one of the first halftone method and the second halftone method selected by the selecting unit and by producing a second output pixel value based on the second color value in accordance with one of the first halftone method and the second halftone method selected by the selecting unit.

6. An image processing device comprising:
  a converting unit that is configured to convert original image data to converted image data by performing a scaling process and a color conversion process on the original image data, the original image data including a plurality of sets of original pixel data, the converted image data including a plurality of sets of converted pixel data, each set of converted pixel data corresponding to at least one set of original pixel data, the converting unit producing each set of converted pixel data based on the corresponding at least one set of original pixel data, each set of converted pixel data including a plurality of color values, the plurality of color values corresponding to a plurality of color materials, each color value indicating an amount of one of the plurality of color materials;
  a determining unit that is configured to determine, for each set of converted pixel data, whether or not at least one set of original pixel data corresponding to the each set of converted pixel data includes predetermined pixel data; and
  a halftone unit that is configured to produce output image data based on the converted image data, the halftone unit including:
    a selecting unit that is configured to select, for each set of converted pixel data, a first halftone method when the determining unit determines that no set of original pixel data corresponding to the each set of converted pixel data includes the predetermined pixel data, and a second halftone method different from the first halftone method when the determining unit determines that the at least one set of original pixel data corresponding to the each set of converted pixel data includes the predetermined pixel data; and
    a pixel data halftone unit that is configured to produce a set of output pixel data for each set of converted pixel data in accordance with one of the first halftone method and the second halftone method selected by the selecting unit, wherein the original image data indicates an original image having a first size, the original image being divided into a plurality of original grids, each original grid corresponding to a set of original pixel data, wherein the converted image data indicates a converted image having a second size same as the first size, the converted image being divided into a plurality of converted grids, each converted grid corresponding to a set of converted pixel data, wherein the converting unit produces the converted image data by reducing the converted image data with a reduction ratio one to a prescribed number, the prescribed number being an integer, the converting unit including:

an acquiring unit that is configured to acquire, for each set of converted pixel data, at least one set of original pixel data satisfying a following condition that each of the at least one set of original pixel data corresponds to the original grid whose part is superposed on the converted grid corresponding to the each set of converted pixel data when the converted image is partially superposed on the original image such that the converted image is shifted, from a position at which the converted image is entirely superposed on the original image, by a prescribed length shorter than a length of one original grid; and a converted pixel data determining unit that is configured to determine the converted pixel data by calculating a weighted average of the at least one set of original pixel data based on size ratio, each size ratio being defined as a ratio of a size of the part of original grid that is superposed on the converted grid corresponding to the converted pixel data to a size of the converted grid.

* * * * *